(12) United States Patent
Keennon et al.

(10) Patent No.: US 10,850,837 B2
(45) Date of Patent: *Dec. 1, 2020

(54) AIR VEHICLE FLIGHT MECHANISM AND CONTROL METHOD FOR NON-SINUSOIDAL WING FLAPPING

(71) Applicant: AeroVironment, Inc., Monrovia, CA (US)

(72) Inventors: Matthew Todd Keennon, Simi Valley, CA (US); Alexander Andryukov, Simi Valley, CA (US); Karl Robert Klingebiel, Simi Valley, CA (US); Henry Thome Won, Sherman Oaks, CA (US)

(73) Assignee: AEROVIRONMENT, INC., Simi Valley, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 16/047,395

(22) Filed: Jul. 27, 2018

(65) Prior Publication Data

US 2019/0055014 A1 Feb. 21, 2019

Related U.S. Application Data

(63) Continuation of application No. 15/581,976, filed on Apr. 28, 2017, now Pat. No. 10,065,737, which is a
(Continued)

(51) Int. Cl.
*B64C 39/00* (2006.01)
*B64C 33/02* (2006.01)
*B64C 39/02* (2006.01)

(52) U.S. Cl.
CPC .......... *B64C 39/003* (2013.01); *B64C 33/02* (2013.01); *B64C 39/028* (2013.01); *B64C 2201/025* (2013.01); *B64C 2201/042* (2013.01)

(58) Field of Classification Search
CPC ..... B64C 39/003; B64C 39/028; B64C 33/00; B64C 33/02; B64C 33/025; B64C 2201/025; B64C 2201/042
See application file for complete search history.

(56) References Cited

U.S. PATENT DOCUMENTS

| 792,154 A | 6/1905 | McMullen |
| 980,840 A | 1/1911 | Rozeboril et al. |

(Continued)

FOREIGN PATENT DOCUMENTS

| CN | 2378287 | 5/2000 |
| CN | 1538863 A | 10/2004 |

(Continued)

OTHER PUBLICATIONS

International Search Report for Serial No. PCT/US2010/037540 dated Aug. 11, 2010.
(Continued)

*Primary Examiner* — Justin B Rephann
(74) *Attorney, Agent, or Firm* — Concept IP LLP; Pejman Yedidsion; Eric Aagaard

(57) ABSTRACT

A flapping wing driving apparatus includes at least one crank gear capstan rotatably coupled to a crank gear, the at least one crank gear capstan disposed radially offset from a center of rotation of the crank gear; a first wing capstan coupled to a first wing, the first wing capstan having a first variable-radius drive pulley portion; and a first drive linking member configured to drive the first wing capstan, the first drive linking member windably coupled between the first variable-radius drive pulley portion and one of the at least one crank gear capstan; wherein the first wing capstan is configured to non-constantly, angularly rotate responsive to a constant angular rotation of the crank gear.

12 Claims, 31 Drawing Sheets

Related U.S. Application Data continuation of application No. 13/969,258, filed on Aug. 16, 2013, now Pat. No. 9,669,925, which is a continuation of application No. PCT/US2012/025518, filed on Feb. 16, 2012.

(60) Provisional application No. 61/443,669, filed on Feb. 16, 2011.

(56) References Cited

U.S. PATENT DOCUMENTS

| | | |
|---|---|---|
| 920,792 A | 5/1911 | De Uherkocz |
| 1,117,585 A | 11/1914 | Marschall |
| 1,364,174 A | 1/1921 | Bird |
| 1,375,297 A | 4/1921 | Jurek |
| 1,450,480 A | 4/1923 | Buck |
| 1,525,565 A | 2/1925 | Bean |
| 1,730,249 A | 10/1929 | Alexander |
| 1,980,002 A | 11/1934 | Savidge |
| 2,017,534 A | 10/1935 | Spencer |
| 2,218,599 A | 10/1940 | Leopold |
| 2,418,569 A | 4/1947 | August |
| 2,584,663 A | 2/1952 | Benson |
| 2,976,739 A | 3/1961 | Lewellen et al. |
| 2,980,187 A | 4/1961 | Smyth-Davila |
| 3,085,355 A | 4/1963 | Carpenter et al. |
| 3,132,620 A | 5/1964 | Court |
| 3,161,376 A | 12/1964 | Lyle |
| 3,191,889 A | 6/1965 | Roberts |
| 3,232,348 A | 2/1966 | Eduard |
| 3,289,770 A | 12/1966 | Hans |
| 3,508,840 A | 4/1970 | Lederlin |
| 3,728,814 A | 4/1973 | Ruston |
| 3,806,277 A | 4/1974 | Hill |
| 4,053,122 A | 10/1977 | Gar |
| 4,095,760 A | 6/1978 | Sommer et al. |
| 4,155,195 A | 5/1979 | Leigh-Hunt |
| 4,428,550 A | 1/1984 | Evans et al. |
| 4,712,749 A | 12/1987 | Fox |
| 4,749,149 A | 6/1988 | Gruich |
| 4,793,573 A | 12/1988 | Keifer |
| 5,163,861 A | 11/1992 | Ruymbeke |
| 5,170,965 A | 12/1992 | Yasuda |
| 5,711,496 A | 1/1998 | Nusbaum |
| 5,899,408 A | 5/1999 | Bowers |
| 5,915,650 A | 6/1999 | Petrovich |
| 5,938,150 A | 8/1999 | King |
| 6,012,962 A | 1/2000 | Arriola |
| 6,082,671 A | 7/2000 | Michelson |
| 6,206,324 B1 | 3/2001 | Smith |
| 6,227,483 B1 | 5/2001 | Therriault |
| 6,530,540 B1 | 3/2003 | Chen |
| 6,540,177 B2 | 4/2003 | Woo et al. |
| 6,659,397 B1 | 12/2003 | Charron |
| 6,769,949 B2 | 8/2004 | Kim et al. |
| 6,783,097 B1 | 8/2004 | Smith |
| 6,802,473 B2 | 10/2004 | Charron |
| 6,840,476 B1 | 1/2005 | Raney |
| 6,959,895 B2 | 11/2005 | Cylinder |
| 7,007,889 B2 | 3/2006 | Charron |
| 7,107,842 B2 | 9/2006 | Wu et al. |
| 7,195,199 B2 | 3/2007 | Ohta et al. |
| 7,219,855 B2 | 5/2007 | Hamamoto et al. |
| 7,331,546 B2 | 2/2008 | Itju et al. |
| 7,341,222 B1 | 3/2008 | Reuel et al. |
| 7,350,745 B2 | 4/2008 | Livingston |
| 7,607,610 B1 | 10/2009 | Sterchak |
| 7,651,051 B2 | 1/2010 | Agrawal et al. |
| 7,937,881 B2 | 5/2011 | Price |
| 7,954,769 B2 | 6/2011 | Bushnell |
| 8,033,499 B2 | 10/2011 | Yang |
| 8,070,090 B2 | 12/2011 | Tayman |
| 8,167,234 B1 | 5/2012 | Moore |
| 8,210,470 B2 | 7/2012 | Ohta et al. |
| 8,333,342 B2 | 12/2012 | Martinelli et al. |
| 8,382,546 B2 | 2/2013 | Ruymbeke |
| 8,395,298 B2 | 3/2013 | Rossman |
| 8,700,233 B1 | 4/2014 | Doman et al. |
| 8,800,936 B2 | 8/2014 | Cowley et al. |
| 9,016,621 B2 | 4/2015 | Zachary |
| 9,072,981 B2 | 7/2015 | Tanous |
| 9,102,407 B2 | 8/2015 | Greenyer |
| 9,216,823 B2 | 12/2015 | Matte |
| 9,258,993 B2 | 2/2016 | Szechenyi et al. |
| 9,272,783 B2 | 3/2016 | Pearson |
| 9,428,269 B1 | 8/2016 | Oppenheimer et al. |
| 9,643,718 B1 | 5/2017 | Beckman et al. |
| 9,669,925 B2 | 6/2017 | Keennon et al. |
| 9,950,790 B2 | 4/2018 | Keennon et al. |
| 9,957,044 B2 | 5/2018 | Keennon et al. |
| 10,266,258 B2 | 4/2019 | Keennon et al. |
| 2001/0019088 A1 | 9/2001 | Smith |
| 2002/0117583 A1 | 8/2002 | Hamamoto et al. |
| 2002/0130218 A1 | 9/2002 | Smith |
| 2003/0039489 A1 | 2/2003 | Obrien et al. |
| 2003/0054724 A1 | 3/2003 | Tomas |
| 2003/0057332 A1 | 3/2003 | Schwetzler et al. |
| 2003/0226933 A1 | 12/2003 | Richard |
| 2003/0230672 A1 | 12/2003 | Charron |
| 2004/0056149 A1 | 3/2004 | Pines et al. |
| 2004/0155145 A1 | 8/2004 | Ohta et al. |
| 2004/0195436 A1 | 10/2004 | Sinclair |
| 2005/0230522 A1 | 10/2005 | Smith |
| 2005/0269447 A1 | 12/2005 | Chronister |
| 2005/0274847 A1 | 12/2005 | Charron |
| 2006/0006280 A1 | 1/2006 | Wood |
| 2006/0060698 A1 | 3/2006 | Ohta et al. |
| 2006/0102782 A1 | 5/2006 | Earl et al. |
| 2006/0144992 A1 | 7/2006 | Jha et al. |
| 2006/0180953 A1 | 8/2006 | Wood et al. |
| 2006/0181179 A1 | 8/2006 | Wood et al. |
| 2006/0259019 A1 | 11/2006 | Sanchez et al. |
| 2007/0138339 A1 | 6/2007 | Sinclair |
| 2007/0157864 A1 | 7/2007 | Aldin et al. |
| 2007/0205322 A1 | 9/2007 | Liao |
| 2007/0210207 A1 | 9/2007 | Liao |
| 2007/0262194 A1 | 11/2007 | Agrawal et al. |
| 2008/0191100 A1 | 8/2008 | Muren |
| 2008/0251632 A1 | 10/2008 | Kim et al. |
| 2009/0008507 A1 | 1/2009 | Pearson |
| 2009/0032648 A1 | 2/2009 | Pearson |
| 2010/0282897 A1 | 11/2010 | Torre |
| 2010/0288871 A1 | 11/2010 | Hwang et al. |
| 2010/0308158 A1 | 12/2010 | Park et al. |
| 2010/0308160 A1 | 12/2010 | Keennon et al. |
| 2010/0308178 A1 | 12/2010 | Gemmati et al. |
| 2011/0278391 A1 | 11/2011 | Kotler |
| 2012/0115390 A1 | 5/2012 | Fuchiwaki et al. |
| 2012/0248243 A1 | 10/2012 | Greenyer |
| 2012/0292438 A1 | 11/2012 | Sreetharan et al. |
| 2013/0240665 A1 | 9/2013 | Cox et al. |
| 2013/0320133 A1 | 12/2013 | Ratti et al. |
| 2014/0061374 A1 | 3/2014 | Cox et al. |
| 2014/0158821 A1 | 6/2014 | Keennon et al. |

FOREIGN PATENT DOCUMENTS

| | | |
|---|---|---|
| CN | 101337582 A | 1/2009 |
| CN | 201183610 | 1/2009 |
| CN | 201214485 | 4/2009 |
| JP | 2008024049 | 2/2008 |
| WO | 2004112929 A1 | 12/2004 |
| WO | 2007026701 A1 | 3/2007 |

OTHER PUBLICATIONS

International Search Report for serial No. PCT/US2012/025518 dated May 25, 2012.

McIntosh, Agarwal & Khan, "Design of Mechanism for Biaxial Rotation of a Wing for Hovering Vehicle," Apr. 2006, vol. 11, No. 2, IEEE/AMSE Transactions on Mechatronics.

PCT International Preliminary Report on Patentability completed Mar. 27, 2012 and dated May 9, 2012 for PCT/US2010/037540.

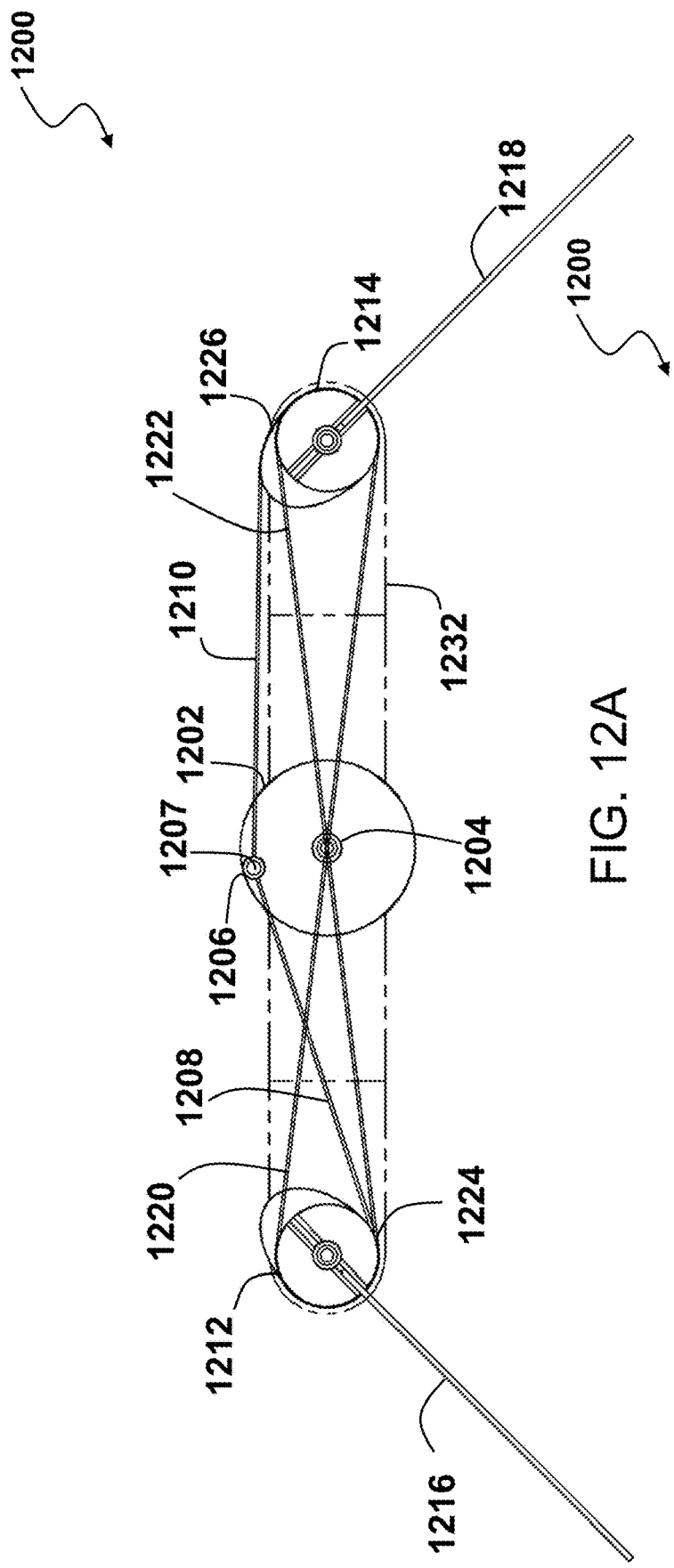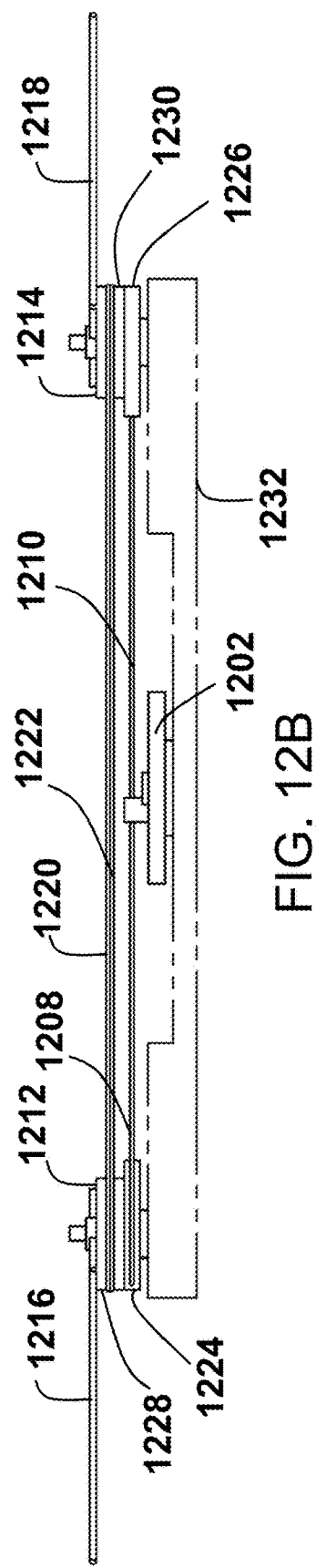
FIG. 12A
FIG. 12B

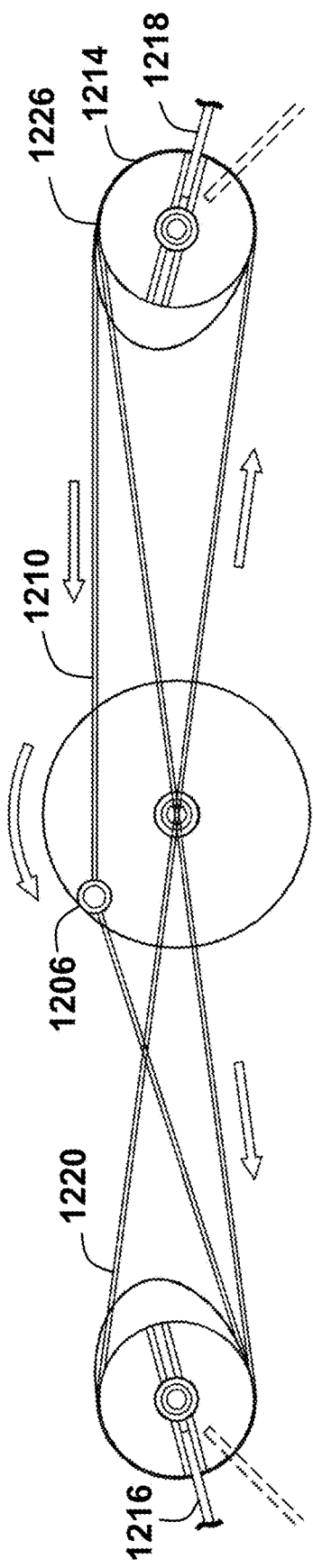
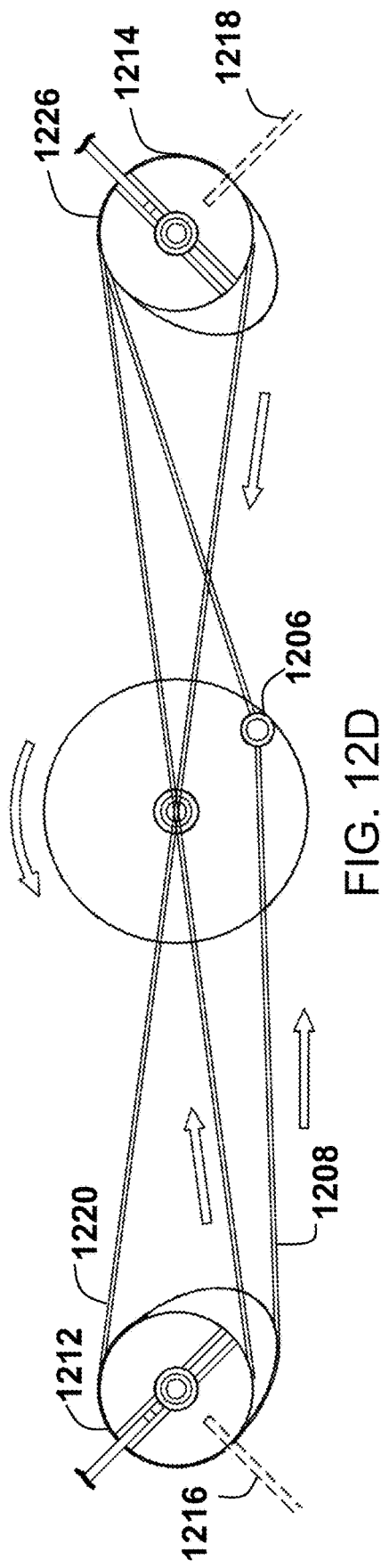
FIG. 12C
FIG. 12D

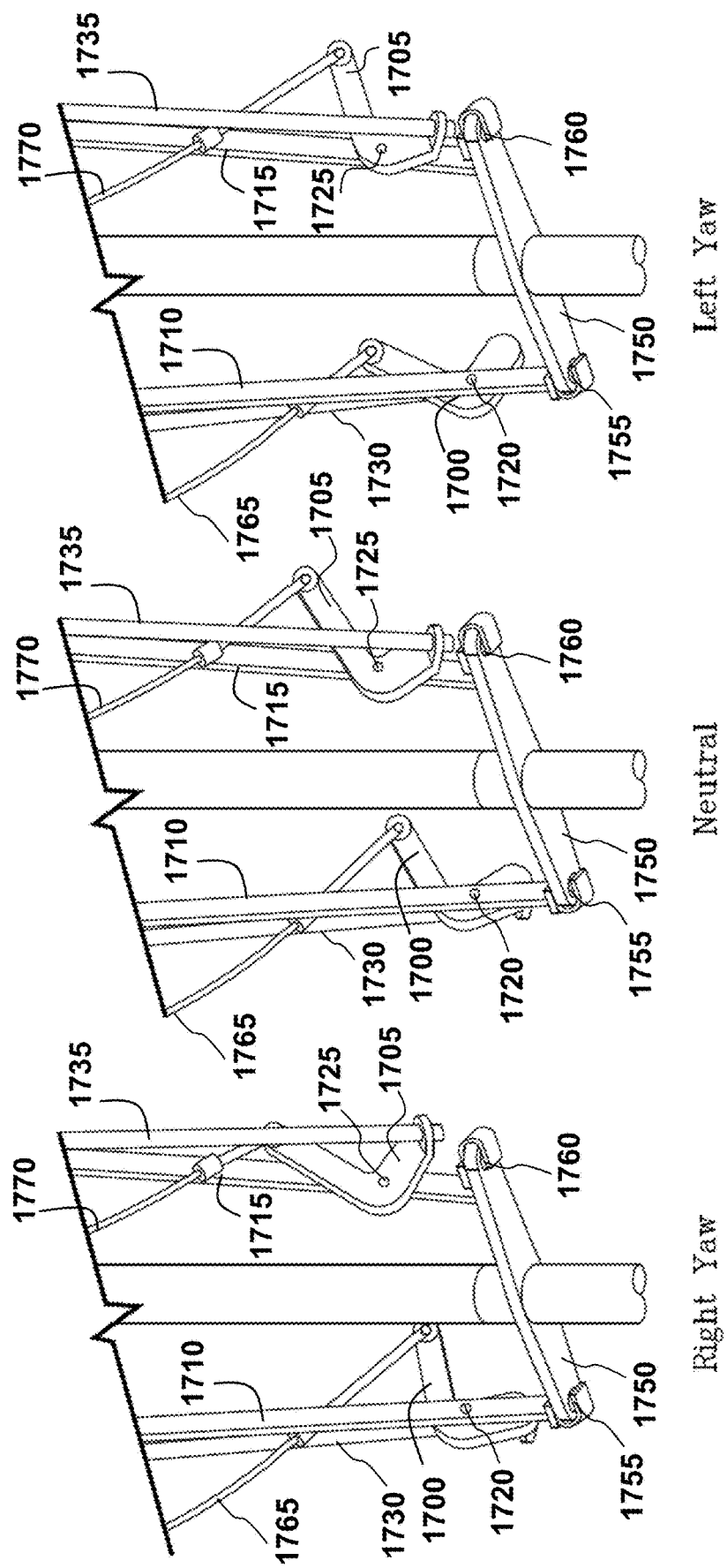
FIG. 17C Left Yaw
FIG. 17B Neutral
FIG. 17A Right Yaw

AIR VEHICLE FLIGHT MECHANISM AND CONTROL METHOD FOR NON-SINUSOIDAL WING FLAPPING

CROSS REFERENCE TO RELATED APPLICATIONS

This application is a continuation of U.S. Nonprovisional application Ser. No. 15/581,976, filed Apr. 28, 2017, which is a continuation of U.S. Nonprovisional application Ser. No. 13/969,258, filed Aug. 16, 2013, which issued as U.S. Pat. No. 9,669,925 on Jun. 6, 2017, which is a continuation of International Application No. PCT/US2012/025518, filed Feb. 16, 2012, which claims priority to and the benefit of U.S. Provisional Application No. 61/443,669, filed Feb. 16, 2011, all of which are hereby incorporated by reference herein in their entirety for all purposes.

STATEMENT REGARDING FEDERALLY SPONSORED RESEARCH OR DEVELOPMENT

This invention was made with Government support under contract no. W31P4Q-06-C-0435 awarded by the US Army Aviation and Missile Command. The US Government has certain rights in the invention.

TECHNICAL FIELD OF ENDEAVOR

The field of the invention is heavier-than-air aircraft, and more particularly unmanned aerial vehicles (UAVs) that have flapping wings.

BACKGROUND

Radio-controlled, heavier-than-air aircraft having sustainable beating wings, i.e., ornithopters.

SUMMARY

Embodiments of the invention include a flapping wing driving apparatus that comprises at least one crank gear capstan rotatably coupled to a crank gear, the at least one crank gear capstan disposed radially offset from a center of rotation of the crank gear, a first wing capstan coupled to a first wing, the first wing capstan having a first variable-radius drive pulley portion, and a first drive linking member configured to drive the first capstan, the first drive linking member windably coupled between the first variable-radius drive pulley portion and one of the at least one crank gear capstan so that the first wing capstan is configured to non-constantly, angularly rotate responsive to a constant angular rotation of the crank gear. The invention may also comprise a second wing capstan coupled to a second wing, the second wing capstan having a second variable-radius drive pulley portion, a second drive linking member windably coupled between the second variable-radius drive pulley portion and one of the at least one crank gear capstan, a first synchronization pulley and a second synchronization pulley disposed on the first wing capstan and the second wing capstans, respectively, and a first crossing synchronization linking member and a second crossing synchronization linking member each windably coupled between the first synchronization pulley and the second synchronization pulley, the first crossing synchronization linking member and the second crossing synchronization linking member, so that the first wing capstan is configured to non-constantly, angularly rotate responsive to a constant angular rotation of the crank gear. In such an embodiment, the first drive linking member may be received by the first variable-radius drive pulley portion at a maximum radius of the first variable-radius drive pulley portion as the first wing capstan changes rotational direction. The first synchronization drive pulley and second synchronization drive pulley may be configured with a constant radius and, in such an embodiment, the first synchronization drive pulley and the second synchronization drive pulley may each be configured to windably receive the first synchronization linking member and the second synchronization linking member at non-constant radius drive pulley portions. A first drive linking member winding peg may be configured to rotatably take up the first drive linking member so that slack in the first drive linking member between the first variable-radius drive pulley portion and one of the at least one crank gear capstan is reduced. Embodiments may include means for reducing slack in the first drive linking member between the first variable-radius drive pulley portion and one of the at least one crank gear capstan. The first drive linking member and the second drive linking member may each comprise a plurality of cables and the plurality of cables may be elastic.

Embodiments of the invention include a flapping wing driving apparatus that may comprise a motor and a plurality of reduction gears coupled between the motor and the crank gear so that at least one of the plurality of reduction gears is configured to drive the at least one crank gear capstan in an orbital path about a center of rotation of the crank shaft. The first and second drive linking members may each be a plurality of cables.

Embodiments of the invention include a flapping wing driving apparatus that may comprise a first wing and a second wing, a first wing capstan and a second wing capstan respectively coupled to the first wing and the second wing, each of the first wing capstan and the second wing capstan having respective variable radius drive pulley portions, at least one rotatable crank gear capstan coupled to a crank arm at a location offset from the axis of rotation of the crank arm, a first drive linking cable and second drive linking cable wherein each drive linking cable is respectively coupled to one of the at least one crank gear capstan, the first drive linking cable windably coupled to the variable-radius drive pulley portion of the first wing drive capstan and the second drive linking cable windably coupled to the variable-radius drive pulley portion of the second wing drive capstan, a first synchronization pulley and a second synchronization pulley each respectively coupled to the first wing capstan and the second wing capstan, and a first crossing synchronization linking member and a second crossing synchronization linking member each windably coupled between the first synchronization pulley and the second synchronization pulley, the first crossing synchronization linking member and the second crossing synchronization linking member wherein the second wing capstan is configured to rotate in a direction counter to a rotation of the first wing capstan, wherein constant angular rotation of the crank arm alternately pulls the first and second drive linking cables to drive the first and second wing capstans with a return force for each of the first and second wing capstans provided respectively by the second and first crossing synchronization linking members so that the first and second wings move in a non-sinusoidal back-and-forth flapping motion. In one embodiment, coupling of the first drive linking cable and second drive linking cable to the first variable-radius drive pulley portion and the second variable-radius drive pulley portion, respectively, is configured so that the first and second drive linking cables are received at respective maximum radii of the first and second variable-radius drive pulley portions as the first and second wings, respectively, are configured to change direction of travel so that the speed and the acceleration of the first and second wings about the end of the wing travel is reduced. The respective variable-radius drive pulley portions of the first wing capstan and the second wing capstan may also each be lob-shaped, oval-shaped, or each of the first second synchronization pulley and second synchronization pulley may be variable-radius synchronization pulleys. In one embodiment, the first variable-radius synchronization pulley and the second variable-radius synchronization pulley are lob-shaped. The invention may also include a motor configured to rotatably drive the crank arm, and the at least one rotatable crank gear capstan may comprise two co-axial, rotatable, crank gear capstans. Each of the first drive linking cable and the second drive linking cable may be elastic.

In a further embodiment, a flapping wing method comprises orbiting a crank capstan about an axis of rotation, pulling a first drive cable with the crank capstan, the first drive cable windably coupled to a variable-radius drive pulley portion fixed on a rotatable first wing capstan to cause the rotatable first wing capstan to rotate, the rotatable first wing capstan coupled to a first wing, winding up a first synchronization cable about a synchronization pulley on the first wing capstan in response to the rotating of the rotatable first wing capstan, and synchronizably rotating a rotatable second wing capstan windably coupled to the first synchronization cable in response to the winding up the first synchronization cable about the synchronization pulley, the rotatable second wing capstan coupled to a second wing, so that the first wing is configured to rotate with a non-sinusoidal angular velocity about a rotation axis of the rotatable first wing capstan as the crank capstan orbits about the axis of rotation at a constant angular velocity and the second wing rotates with about a rotation axis of the rotatable second wing capstan. The method may also comprise pulling a second drive cable with the crank capstan after pulling the first drive cable, the second drive cable windably coupled to a variable-radius drive pulley portion fixed on a rotatable second wing capstan to cause the rotatable second wing capstan to rotate, the rotatable second wing capstan coupled to a second wing, winding up a second synchronization cable about a synchronization pulley on the second wing capstan in response to the rotating of the rotatable second wing capstan, and synchronizably rotating the rotatable first wing capstan windably coupled to the second synchronization cable in response to the winding up the second synchronization cable about the synchronization pulley on the second wing capstan so that the second wing is configured to rotate with a non-sinusoidal angular velocity about a rotation axis of the rotatable second wing capstan as the crank capstan orbits about the axis of rotation at a constant angular velocity and the first wing rotates about a rotation axis of the rotatable first wing capstan. The pulling of the second drive cable may begin when the first drive cable is received at a maximum radius of the variable-radius drive pulley portion on the first wing capstan. Pulling the second drive cable may begin as the first wing changes rotational direction. The synchronization pulley on the second wing capstan may be non-circular. The second drive cable may also be elastic. Pulling of the first drive cable may begin when the second drive cable is received at a maximum radius of the variable-radius drive pulley portion on the second wing capstan. The synchronization pulley on the first wing capstan may be non-circular.

Embodiments of the invention may also include a flapping wing driving apparatus that comprises means for orbiting at least one crank gear capstan about a center of rotation and at a constant velocity, a first wing capstan coupled to a first wing, the first wing capstan having a first variable-radius drive pulley portion, and a first drive linking member configured to drive the first wing capstan, the first drive linking member windably coupled between the first variable-radius drive pulley portion and one of the at least one crank gear capstan so that the first wing capstan is configured to non-constantly, angularly rotate responsive to a constant velocity of the means for orbiting. The invention may also comprise a second wing capstan coupled to a second wing, the second wing capstan having a second variable-radius drive pulley portion, a second drive linking member windably coupled between the second variable-radius drive pulley portion and one of the at least one crank gear capstan, a first synchronization pulley and a second synchronization pulley coupled to the first wing capstan and the second wing capstans, respectively, and a first crossing synchronization linking member and a second crossing synchronization linking member each windably coupled between the first synchronization pulley and the second synchronization pulley, the first crossing synchronization linking member and the second crossing synchronization linking member, so that the first wing capstan is configured to non-constantly, angularly rotate responsive to a constant angular rotation of the crank gear.

Another embodiment of the invention includes a flapping wing driving apparatus that comprises a first wing and a second wing, a first wing capstan and a second wing capstan respectively coupled to the first wing and the second wing, means for rotating the first wing capstan and the second wing capstan in a predetermined non-sinusoidal acceleration from a first sweep angle position to a second sweep angle position of the first wing and the second wing, means for returning the first wing capstan and the second wing capstan to their respective first sweep angle positions after the respective first sweep angle position to second sweep angle position predetermined non-sinusoidal acceleration, so that the means for rotating and the means for returning are configured so that the first wing and second wing move in a non-sinusoidal back-and-forth flapping motion. The means for returning may further comprise means for returning the first wing capstan and the second wing capstan to their respective original angular positions in a predetermined non-sinusoidal acceleration from the second sweep angle position to the first sweep angle position.

BRIEF DESCRIPTION OF THE DRAWINGS

Embodiments are illustrated by way of example and not limitation in the figures of the accompanying drawing, and in which:

FIGS. 12A-12F show an embodiment of the flapping mechanism having wing capstans each driven by a crank gear in a first rotational direction by drive linking cables and in an opposite rotational direction by crossing synchronization linking members;

FIGS. 17A, 17B, and 17C illustrate an embodiment for providing yaw control of an air vehicle frame using lever arms coupled to respective pushrods to drive respective drive wing root spars;

DETAILED DESCRIPTION

Embodiments of the present invention include radio-controlled, heavier-than-air aircraft having flapping wings, i.e., ornithopters, where the vehicle orientation control may be affected by variable sweep angles of deflection of the flappable wings in the course of sweep angles of travel. The air vehicle may comprise at least two wings, or airfoils, having the principal functions of providing lift and generating control moments or torques about the air vehicle. Either of two such airfoils may be disposed on each side of the fuselage, or structural body, of the air vehicle. Each wing may comprise a root-to-wingtip spar, or mast, having a proximal end proximate to the wing root, and a distal end proximate to the wingtip. Each wing may comprise a root spar, or boom, proximate to the proximal end of the mast, and the boom may be oriented, fixedly rotationally, but otherwise substantially orthogonal to the mast. A lifting surface membrane element for each wing may be attached to the respective mast and the boom, and the membrane and boom may rotate or pivot about the longitudinal axis of the mast. The wings may be driven by an onboard flapping drive element, e.g., at least one motor and mechanical movement so as to be flapped so that their wingtips circumscribe arcs about the longitudinal axis of the air vehicle. If the boom is free to travel some angular amount about the mast, for example, then the distal end of the boom and the trailing edge of the lifting surface tend to trail the motion of the mast and leading portion of the lifting surface during flapping strokes. The distal end of the boom may be variably restrained relative to the mast, thereby variably limiting the angular travel of the boom about the mast and/or varying the wing membrane slack, or luffing of the membrane. A thrust force may be generated via the airfoils, each airfoil's thrust having an instantaneous magnitude depending on the direction of mast flapping, i.e., a forward stroke or a backward stroke, the angle of each boom relative to its respective mast and/or the amount of luffing in the wing membrane and/or the angular velocity of the wing during the stroke.

Figure 1:
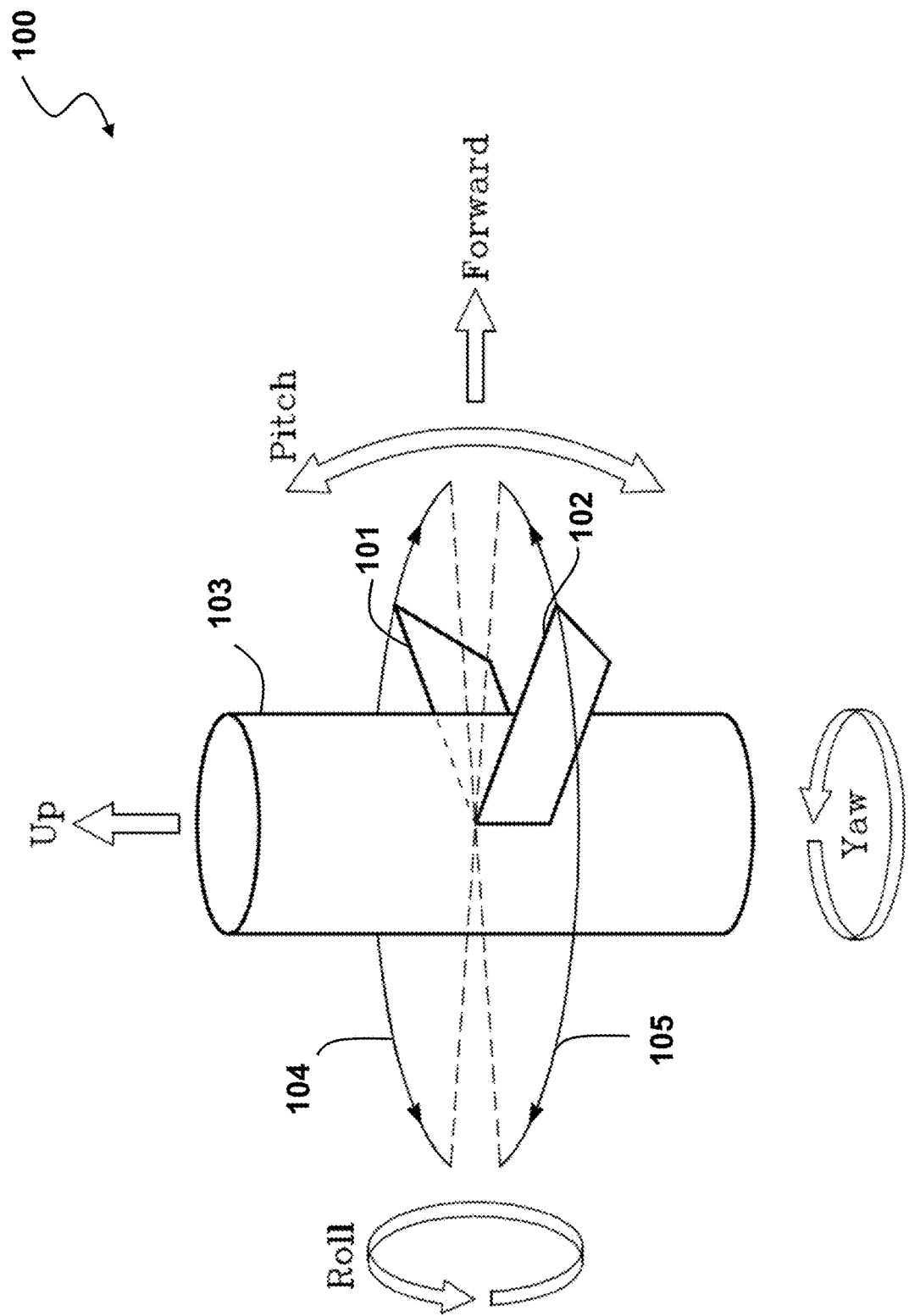
FIG. 1 is a perspective view of one embodiment of an air vehicle that has two flappable wings that flap in a horizontal plane about the air vehicle.

FIG. 1 depicts an exemplary air vehicle comprising two flappable wings, a flapping drive subsystem, and a pitch, yaw, and roll control subsystem. The exemplary air vehicle may be powered via batteries and may receive radio control signals via a radio control system. FIG. 1 depicts an aircraft 100 having two airfoils 101, 102 a left (port) airfoil 101 and a right (starboard) airfoil 102, each attached to an aircraft structure 103, such as a fuselage, and where the flapping in the forward direction of the aircraft, where the wingtips of the airfoils generally circumscribe arcs 104, 105 in the horizontal plane about the aircraft 100, and their respective extents of travel each define a sweep angle of travel.

Figure 2:
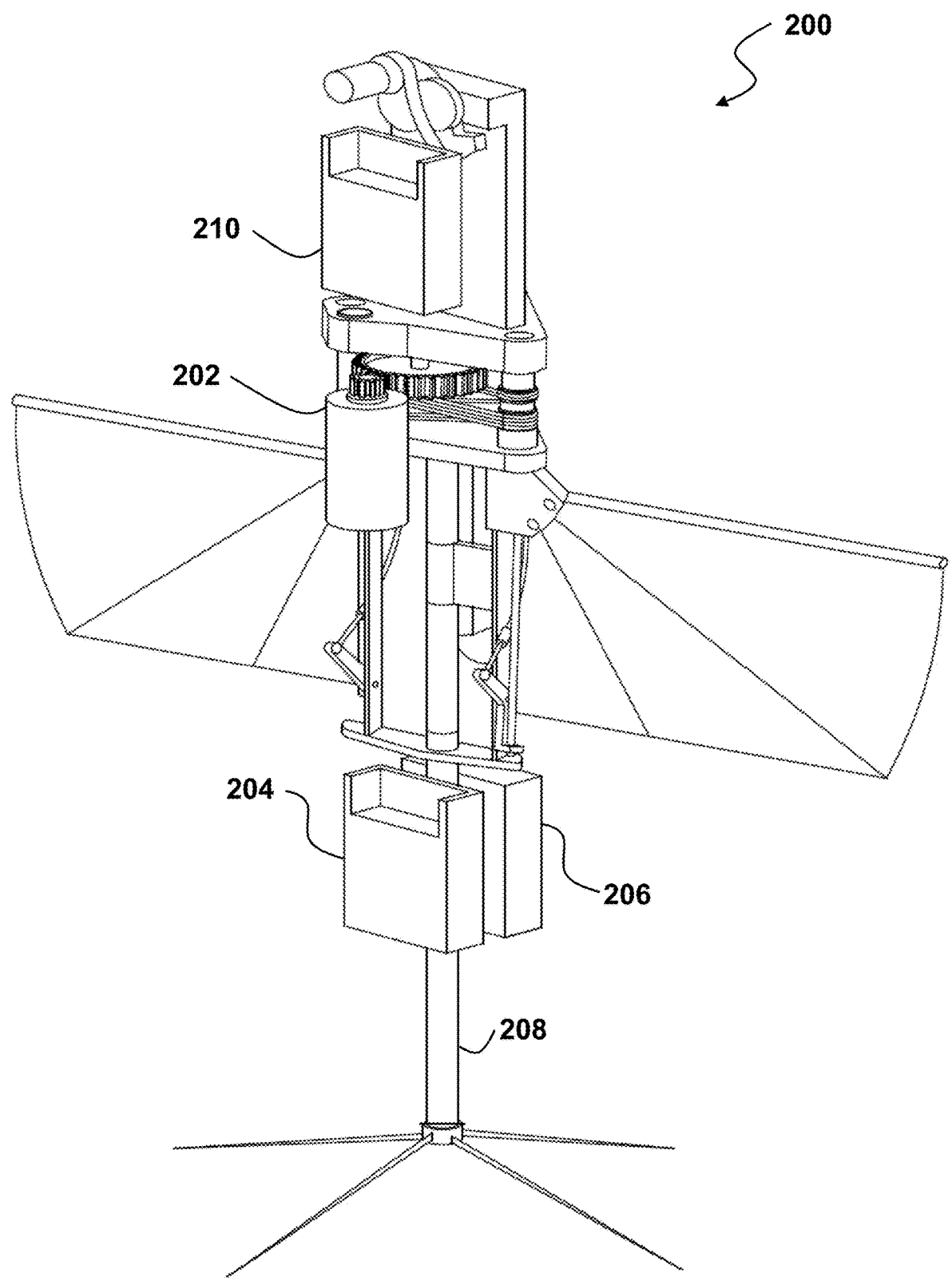
FIG. 2 is a perspective view of an air vehicle that has a flapping mechanism mid-body, vehicle components located above the flapping mechanism, and batteries on a tail post.

FIG. 2 depicts an embodiment of an air vehicle 200 having a flapping mechanism 202 mid-body, a computer processing unit, a radio receiver, a radio transmitter, and a camera, all positioned above the flapping mechanism 202. Battery packs (204, 206) may be positioned on or about a tail post 208. Such battery packs may each be, for example, 50 milliamp-hour (mAHh) cells. A body shell (not shown) may be installed on, about and/or over the vehicle frame. The air vehicle 200 is configured to maintain a center of gravity about the vehicle, horizontal, and fore/aft axes. A third battery pack 210 may be disposed above the flapping mechanism.

Figure 3A:
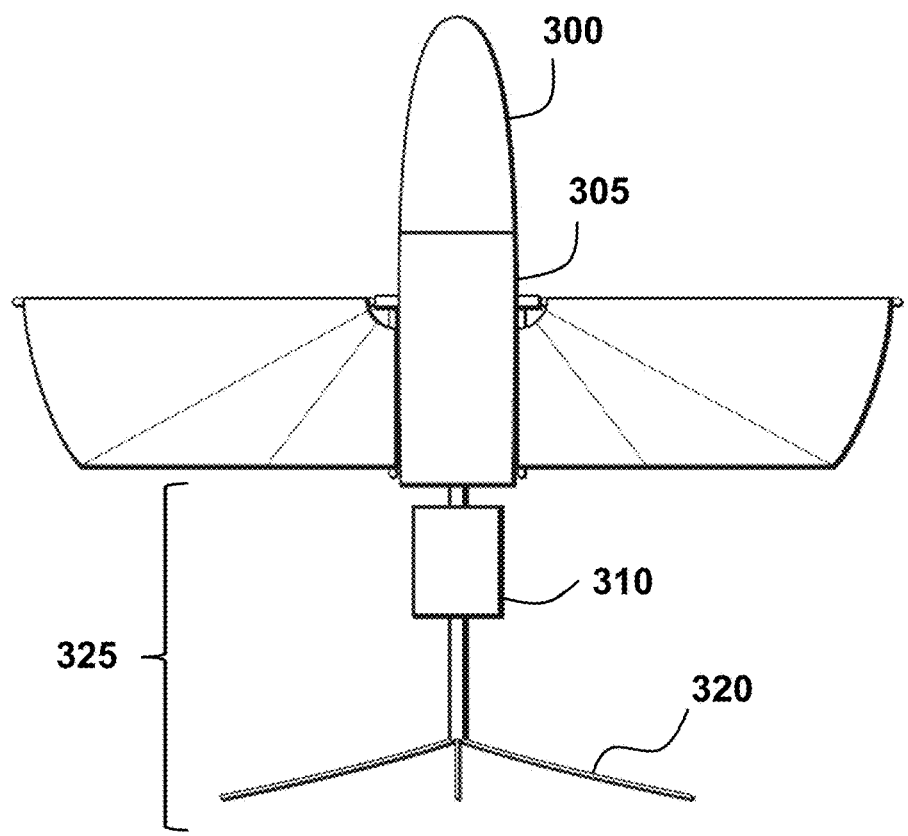
FIGS. 3A, 3B, and 3C are front plan, front perspective and side views, respectively, illustrating components placement, flapping mechanism placement, and battery placement on a lower body gimbal frame system of an air vehicle.
Figure 3B:
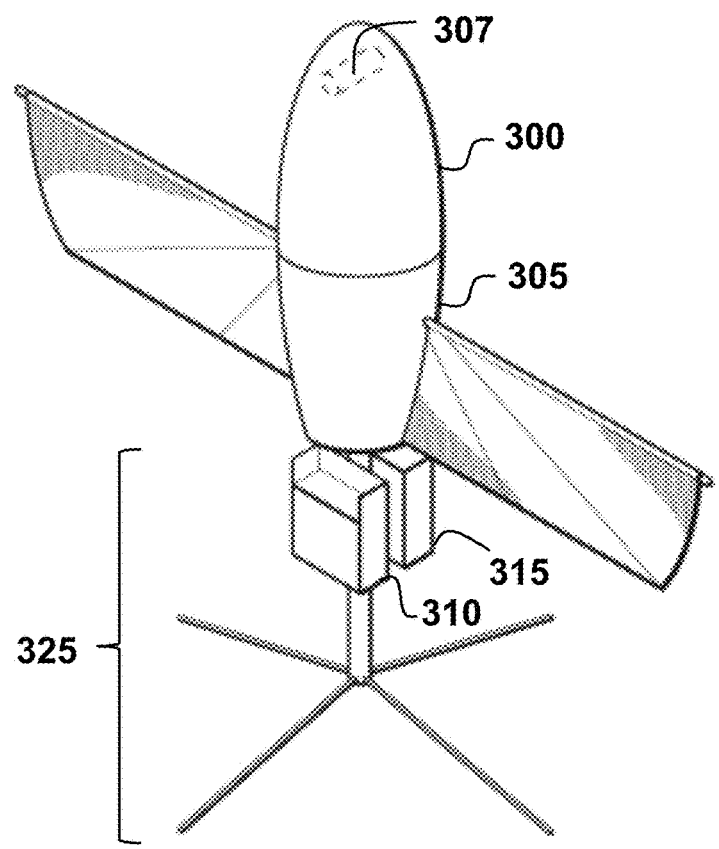
Figure 3C:
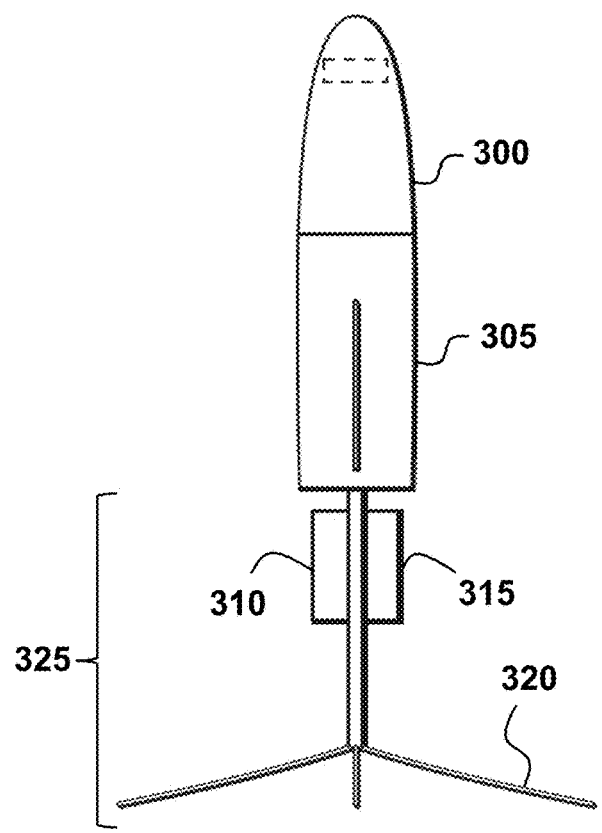

FIGS. 3A, 3B, and 3C are front plan, front perspective, and side views, respectively, of an air vehicle illustrating vehicle component placement, flapping mechanism placement, and battery placement on a lower body gimbal frame system (See FIGS. 5C, 5D). The vehicle components, such as the computer processing unit, radio receiver, radio transmitter, and camera, may be located in a component volume 300 located above the flapping mechanism volume 305. In FIGS. 3B and 3C, a yaw servo 307 may be positioned at or near the top of the vehicle (represented as a dashed cylinder) projecting to the back of the vehicle. In one embodiment, a camera may be positioned at the upper front of the vehicle, and a battery pack may be on the starboard side (each not shown). The flapping mechanism in the flapping mechanism volume 305 may be arranged in the middle portion of the air vehicle, and the additional batteries (310, 315) positioned at the front and back of the tail element, respectively, with the additional batteries (310, 315) and tail element 320 defining a tail portion 325.

Figure 4A:
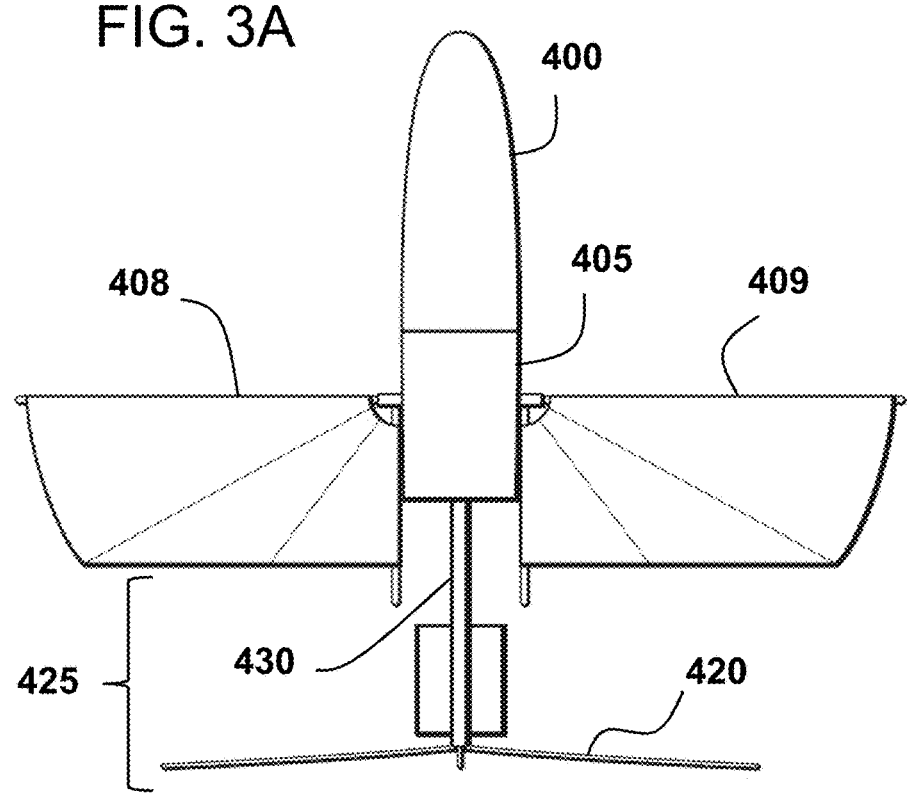
FIGS. 4A, 4B, and 4C are front plan, front perspective and side views, respectively, illustrating vehicle components placement, flapping mechanism placement, and battery placement on a lower body gimbal frame system of an air vehicle.
Figure 4B:
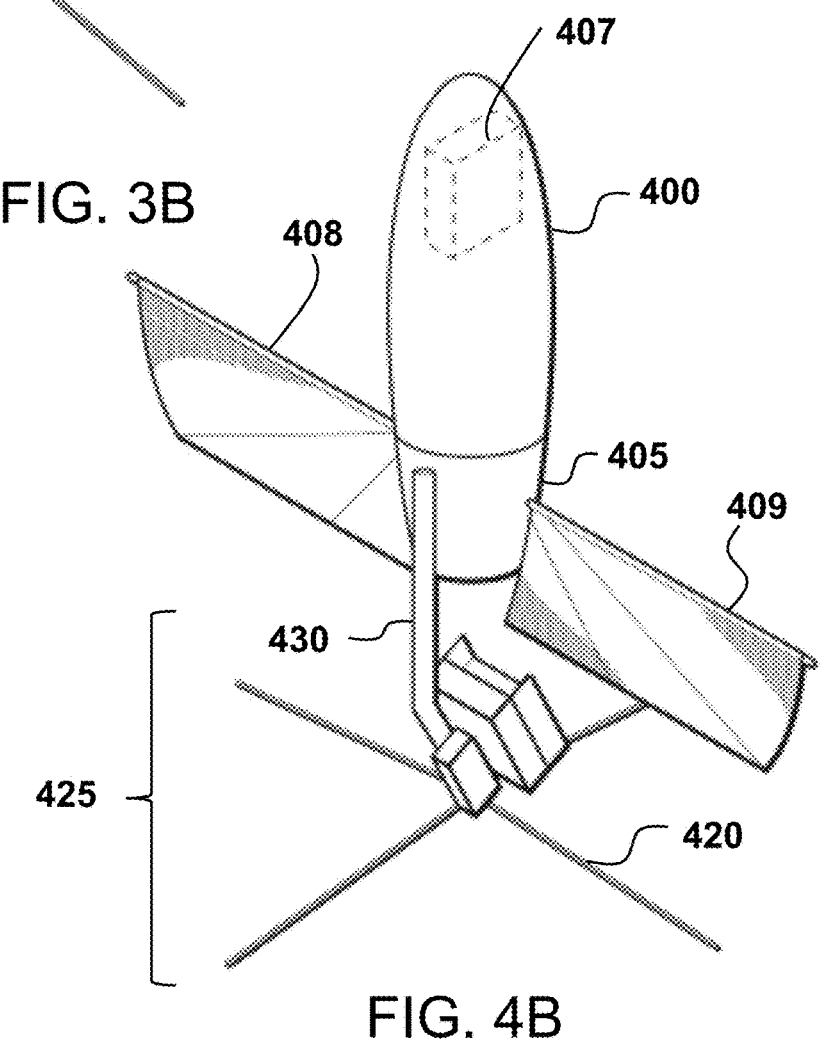
Figure 4C:
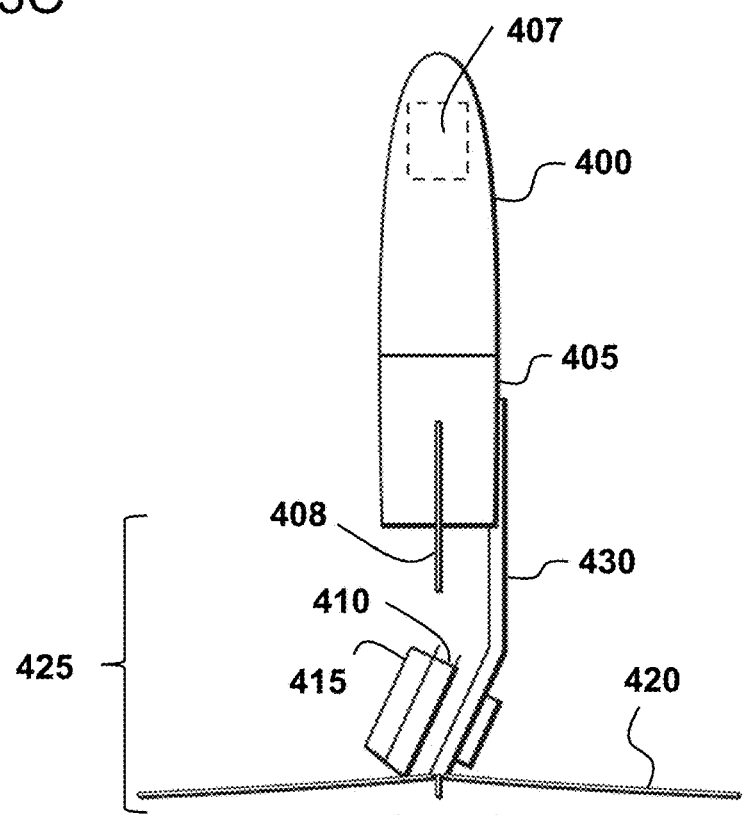
Figures 5A, 5B:
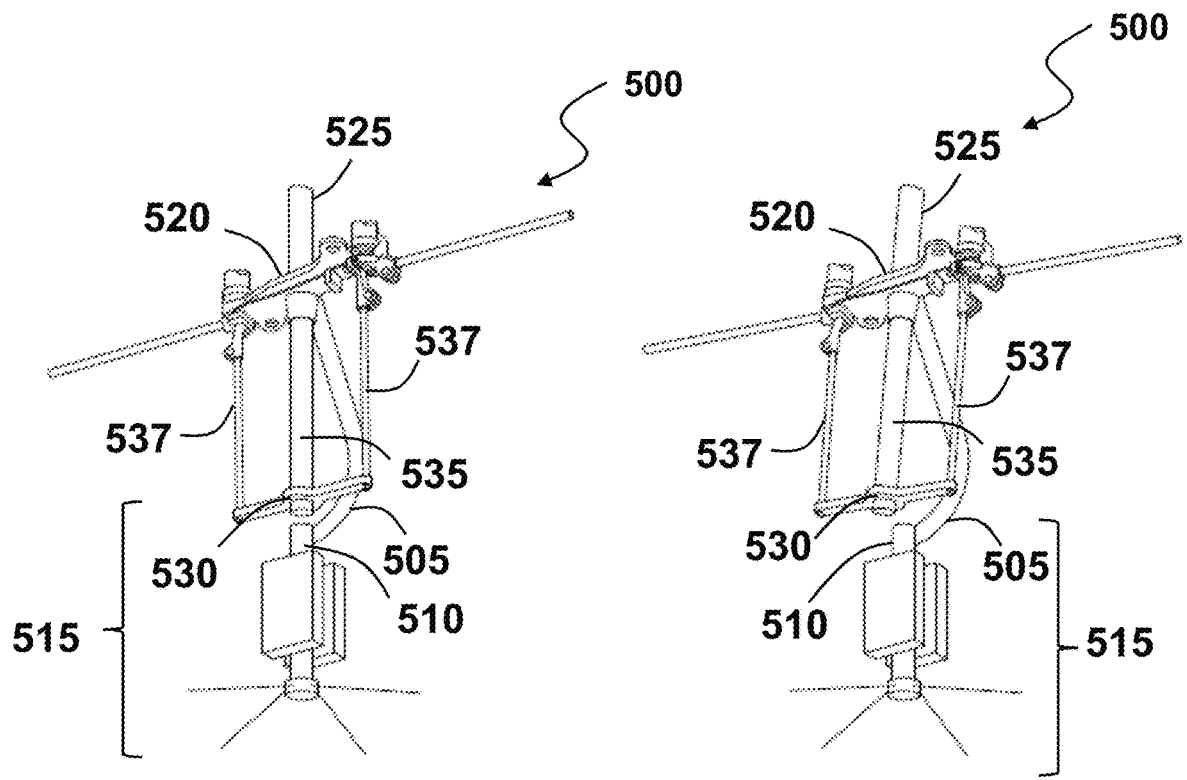
FIGS. 5A and 5B are perspective views of an air vehicle frame having one embodiment of an integrated boom vang system.

FIGS. 4A, 4B, and 4C are front plan, front perspective and side views, respectively, of an air vehicle illustrating vehicle component placement, flapping mechanism placement, and battery placement on a lower body gimbal frame system (See FIGS. 5C, 5D). Similar to the embodiment illustrated in FIGS. 3A-3C, the vehicle components, such as the computer processing unit, radio receiver, radio transmitter, and camera, may be located in a component volume 400 located above the flapping mechanism volume 405. In FIGS. 4B and 4C, an additional battery 407 may be positioned at or near the top of the vehicle in addition to a yaw servo (not shown). The flapping mechanism in the flapping mechanism volume 405 that drives the flappable wings (408, 409) may be arranged in the middle portion of the air vehicle, and the additional batteries (410, 415) may be positioned at the front and back of a distal end of the tail element 420, respectively, with the additional batteries and tail element 420 defining a tail portion 425. In FIGS. 4A, 4B and 4C, the spine 430 may range from a top portion of the vehicle to the tail element 420 in an integrated boom bang system embodiment (See FIGS. 5A, 5B).

FIGS. 5A and 5B are perspective views of an air vehicle frame having one embodiment of an integrated boom vang system. The air vehicle frame 500 may have a lower arcuate spine 505 extending from a proximal end 510 of a tail portion 515 outwardly to a position above and adjacent to a gimbal joint 520, with the gimbal joint 520 connecting an upper spine 525 to a rotatable boom vang support 535. A control gimbal 530 may receive rotatable boom vang support 535 for trimming the position of the boom vangs 537 in relation to the air vehicle frame. FIG. 5B depicts a configuration with a pitch deflection for the rotatable boom vang support 535 about the gimbal joint 520 for pitch control of the air vehicle during flight.

Figures 6A, 6B:
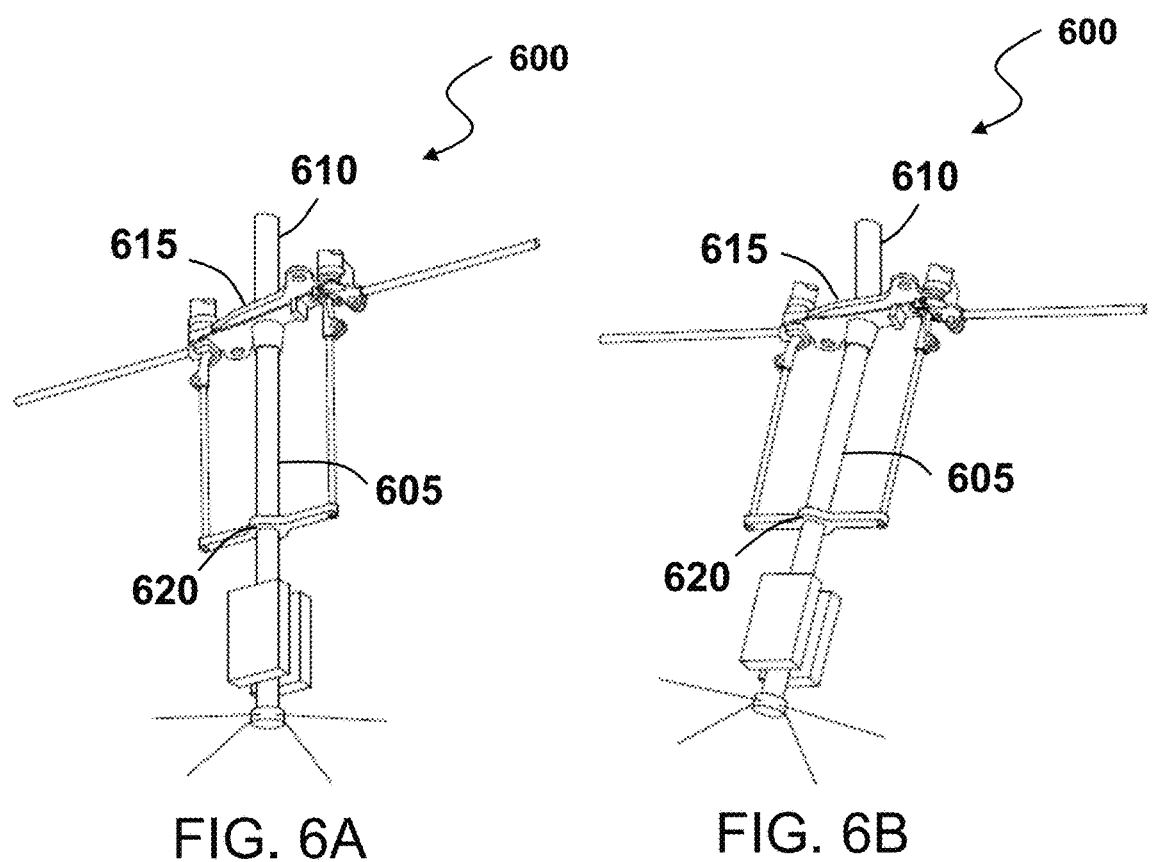
FIGS. 6A and 6B are perspective views of an air vehicle frame having a lower body gimbal system.

FIGS. 6A and 6B are perspective views of an air vehicle frame 600 having a lower body gimbal system. A rotatable boom vang support 605 that may be rotatably coupled to an upper spine 610 through a gimbal joint 615. The boom vang support 605 may be received by a control gimbal 620 for trimming. In FIG. 6A, boom vang support 605 is aligned with the upper spine 610. In FIG. 6B, the boom vang support 605 is illustrated as rotated out of alignment with the upper spine 610 to indicate a pitch deflection for pitch control of the air vehicle during flight.

Figure 7A:
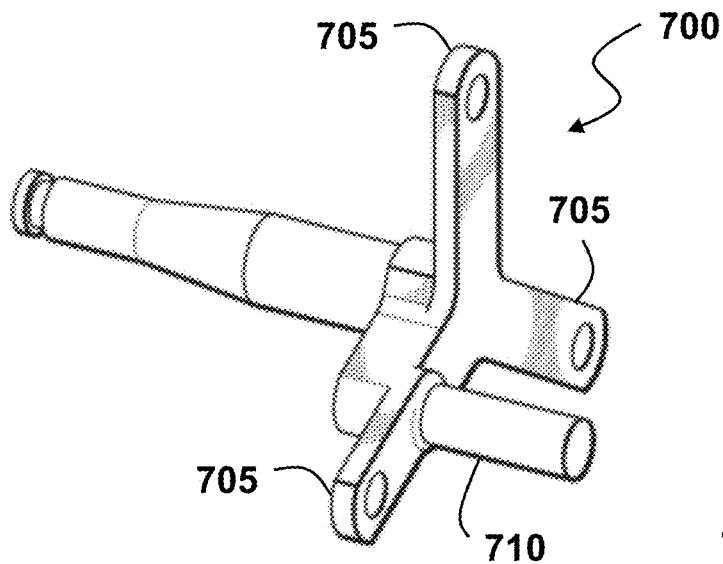
FIGS. 7A, 7B, and 7C are perspective views of three embodiments of a crank arm to drive a flapping mechanism.
Figure 7B:
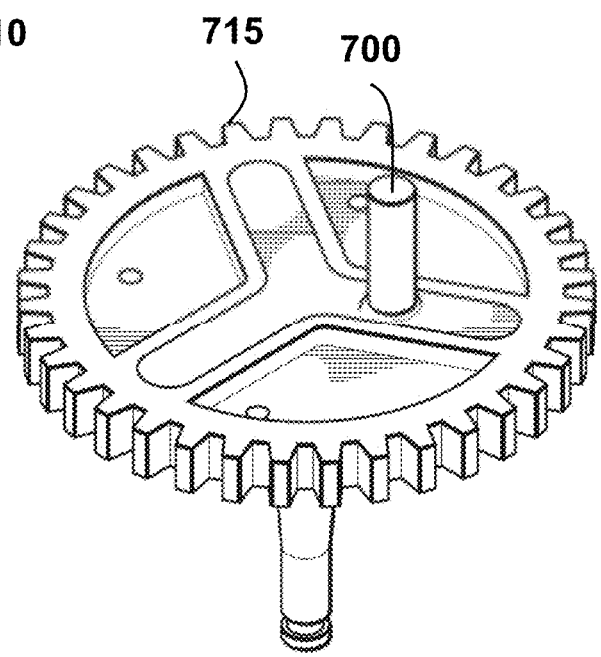
Figure 7C:
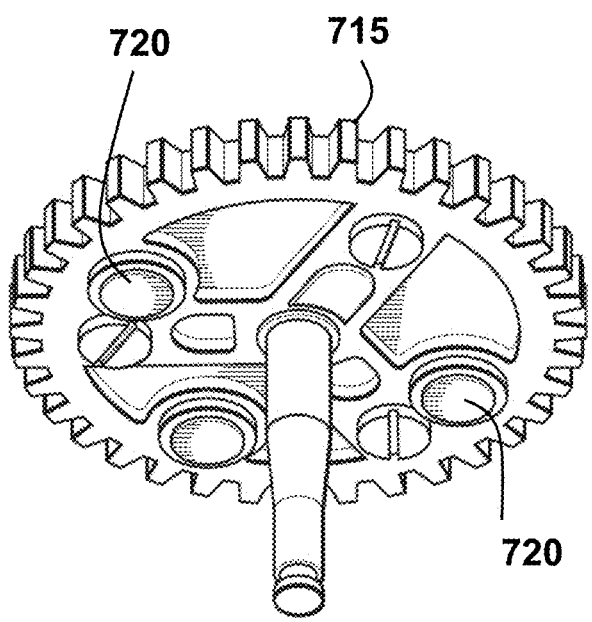

FIGS. 7A, 7B and 7C are perspective views of embodiments of a crank arm for driving a flapping mechanism of an air vehicle. In FIG. 7A, a crank arm 700 is illustrated having three arms 705 positioned 120 degrees from one another to receive crank position magnets (not shown) to enable collection of angular rotation information for the crank arm. One of the arms 705 may have a support element 710 disposed radially offset from a center of rotation of the arms to receive at least one capstan to accept drive linking cables (See FIG. 8). FIG. 7B depicts the inclusion of an outer gear 715 to the embodiment of the crank arm shown in FIG. 7A to facilitate driving the crank arm by reduction gears from a motor (See FIG. 10). FIG. 7C depicts the outer gear having the addition of crank position magnets 720 at alternate locations for increasing the crank position accuracy when the outer gear 715 is included with the crank arm 700.

Figure 8:
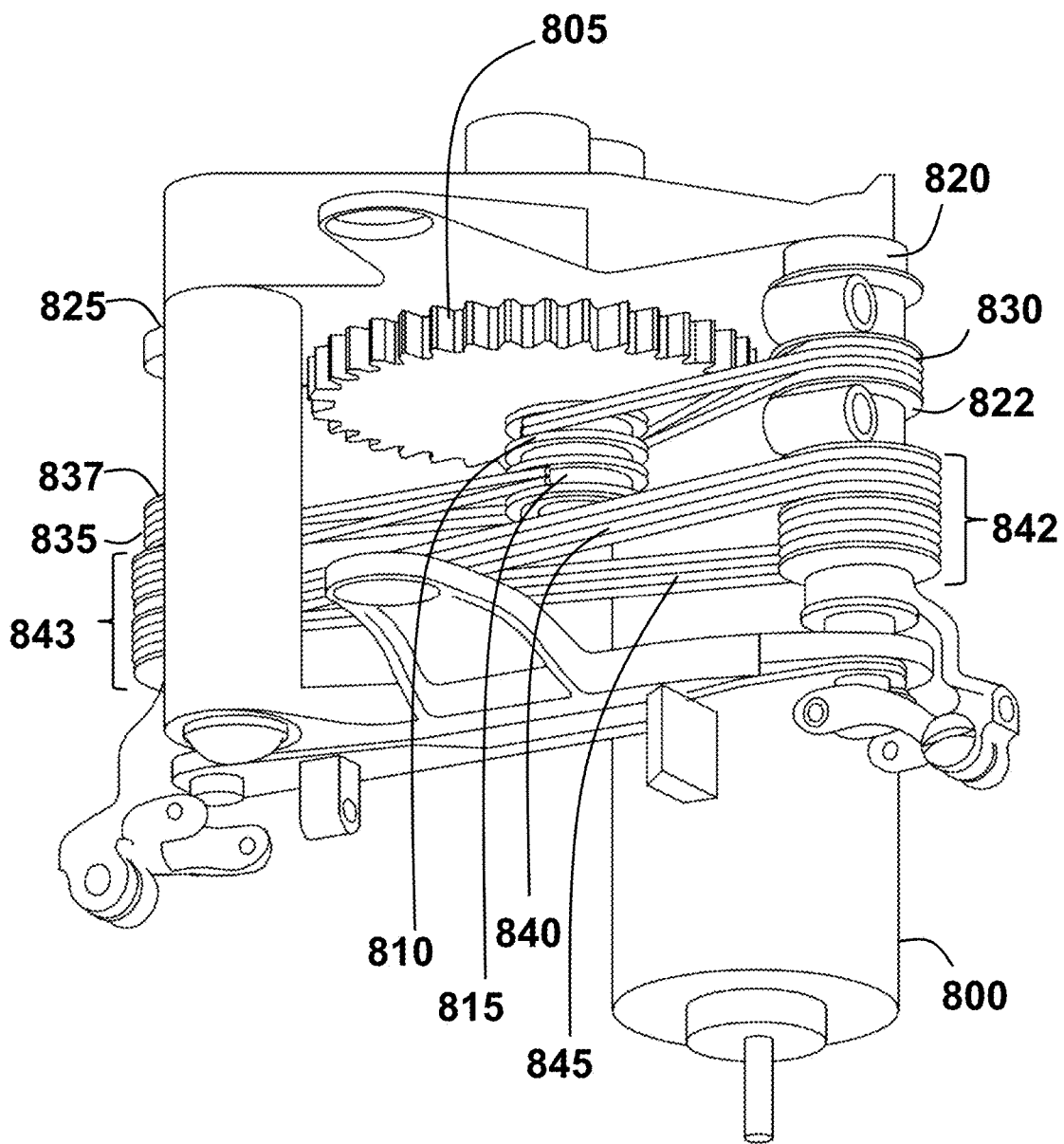
FIG. 8 is a front perspective view of one embodiment of a crank arm and pulley assembly of a flapping mechanism.

FIG. 8 is a perspective view of one embodiment of a gear and pulley assembly of a flapping mechanism. A drive motor 800 may drive a crank arm that may be a crank gear 805. A first crank gear capstan 810 may be positioned co-linear with a second crank gear capstan 815 and rotatably coupled to the crank gear 805, where both the first and second crank gear capstans (810, 815) are offset from a rotational axis of the crank gear 805. In an alternative embodiment, the first and second crank gear capstans (810, 815) are a single capstan. A first wing capstan 820 may be disposed at a first axis of rotation of the first flapping element and a second wing capstan 825 may be disposed at a first axis of rotation of the second flapping element. A first drive linking member 830 may be a cable that attaches to the first crank gear capstan 810 at a first end of the cable and windably couples to a first variable-radius drive pulley portion 822 of the first wing capstan 820 at a second end of the cable to drive the first wing capstan 820 (See e.g., FIG. 12A). A second drive linking member 835 may also be a cable that attaches to the second crank gear capstan 815 at a first end of the cable and windably couples to a second variable-radius drive pulley portion 837 of the second wing capstan 825 at a second end of the cable to drive the second wing capstan 825 (See e.g., FIG. 12A).

A crossing synchronization linking member that may be a first synchronization cable 840 may be windably coupled between first and second wing capstans (820, 825) at the first and second synchronization pulleys (842, 843), respectively, with the first synchronization cable 840 spooled in a clockwise orientation on each of the first and second synchronization pulleys (842, 843). A second synchronization linking member that may be a second synchronization cable 845 may be windably coupled between first and second wing capstans (820, 825) at the first and second synchronization pulleys (842, 843), respectively, with the second synchronization cable 845 spooled in a counterclockwise orientation on each of the first and second synchronization pulleys (842, 843), such that first and second synchronization cables (840, 845) are crossed over the crank gear 805. In some embodiments, the first synchronization cable 840 attaches the first wing capstan 820 in a counterclockwise orientation to the second wing capstan 825, and the second synchronization cable 845 attaches the second wing capstan 825 in a clockwise orientation to the first wing capstan 820. In either of these embodiments, the first synchronization cable 840 attaches the first wing capstan 820 in an orientation opposite to that of the second synchronization cable 845 attaching to the second wing capstan 825, such that first and second synchronization cables (840, 845) function as synchronization strings for the first and second flapping elements. In this manner, the first and second wing capstans (820, 825) are configured to non-constantly, angularly rotate responsive to a constant angular rotation of the crank gear 805.

In an alternative embodiment, the first synchronization cable 840 may attach to the first wing capstan 820 in a clockwise, or counterclockwise, orientation to the second wing capstan 825 via multiple strings, e.g., via four strings, and the second synchronization cable 845 may attach to the second wing capstan 825 in a counterclockwise, or clockwise, orientation to the first wing capstan 820 via multiple strings, e.g., via four stings. Also, the first drive linking cable 830 may attach to the first crank gear capstan 810 via two strings and the second drive linking cable 835 cable may attach to the second wing capstan 825 via two strings. The first and second wing capstan (820, 825) may each allow for the fixing of the strings to the respective capstans.

Figure 10:
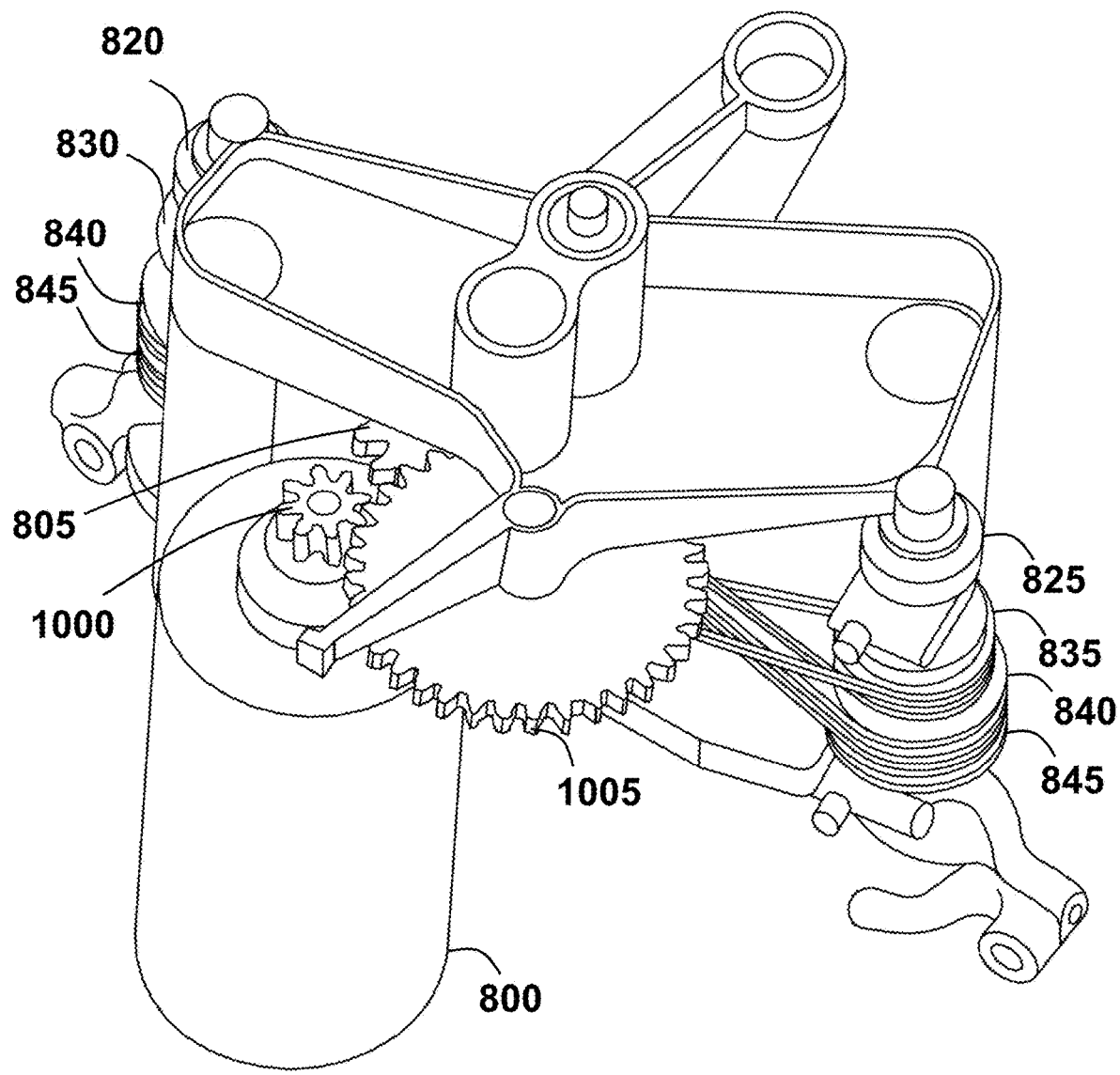
FIG. 10 is a rear perspective view of the embodiment of the crank arm and pulley assembly first illustrated in FIG. 8.

The top of the drive motor (as shown in FIG. 10) comprises a gear that drives a set of reduction gears such as a secondary gear that drives a third gear that may include distributed magnets, for example at the distributed portions of the third gear. The first and second crank gear capstans (810, 815) are rotationally disposed from the lower plane of the third gear that may be the crank gear 805.

Figure 9:
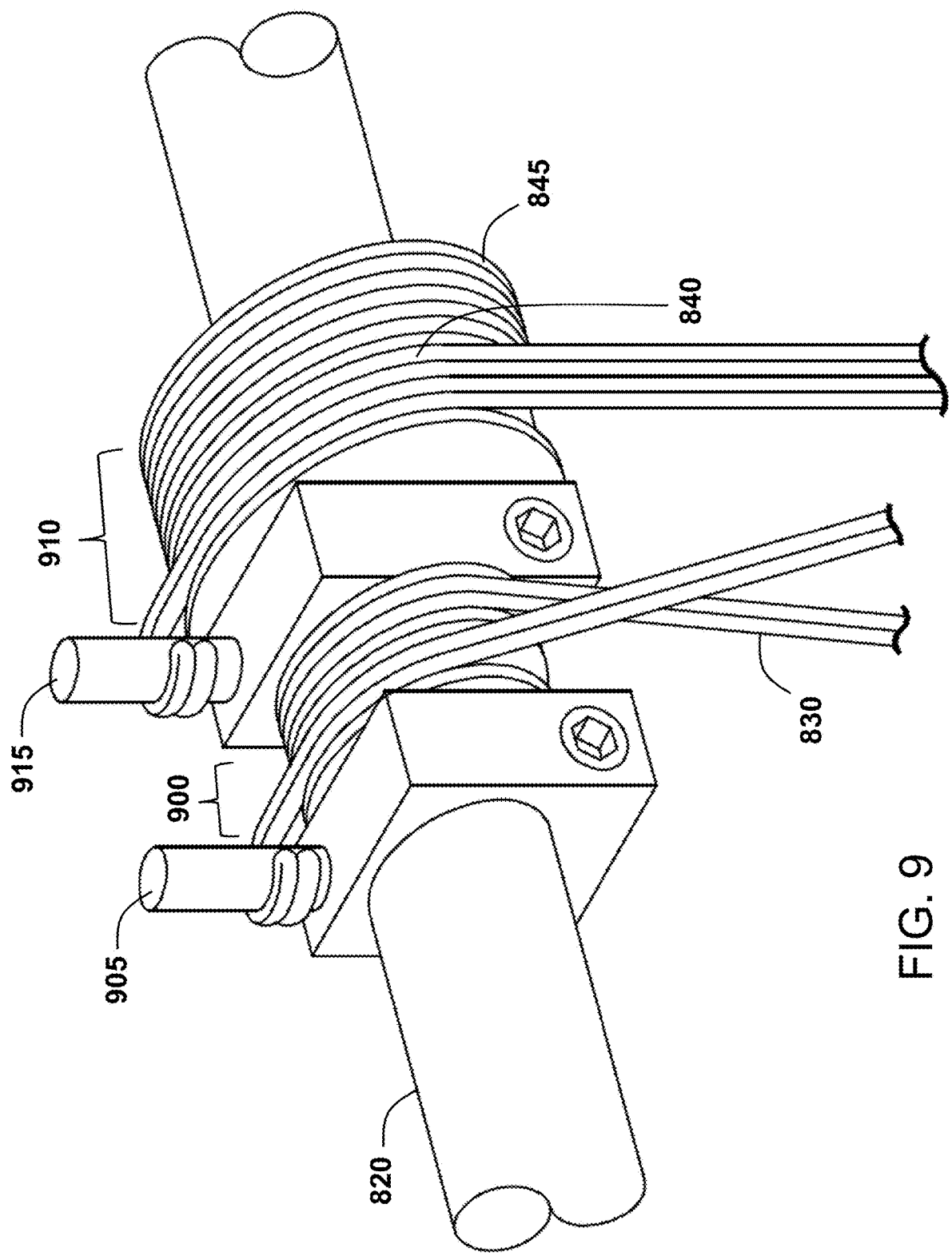
FIG. 9 is a perspective view of one embodiment of a wing capstan having pulley portions and string winding pegs to windably couple a plurality of cables to the wing capstan.

FIG. 9 is a perspective view of a wing capstan having pulleys, synchronizing strings and drive strings windably coupled to the first wing capstan. The first drive cable 830, illustrated as consisting of two individual strings, may be windably coupled onto a first drive pulley portion 900 that may have a variable-radius, i.e. not round. In the embodiment illustrated, with the first drive cable 830 having two individual strings, two individual pulley portions may collectively be referred to as the first drive pulley portion 900 and each may have a variable-radius shape where windably receiving the strings of the first drive cable 830. Termination portions of the first drive cable 830 may be fixedly coupled to a string winding peg 905 to enable winding of the first drive cable 830 about the first drive pulley portion 900 as the wing capstan 820 rotates. The string winding peg 905 may enable trimming of the first wing capstan 820 as the winding peg 905 is rotated to spool more or less of the first drive cable 830 for any given angular location of the first wing capstan. The first and second crossing synchronization linking members (840, 845) are each windably coupled to a first synchronization pulley 910, with the first crossing synchronization linking member 840 illustrated as windably coupled to the first wing capstan in a counterclockwise orientation and the second crossing synchronization linking member 845 illustrated as windably coupled to the first wing capstan in a clockwise orientation. Termination portions of the first and second synchronization linking members (840, 845) may be fixedly coupled to a second string winding peg 915 to enable winding and unwinding of the first and second synchronization linking members (840, 845) about the first synchronization pulley 910 as the wing capstan 820 rotates. Synchronizing strings function to move the capstan of the flapping assembly in alternating clockwise and anticlockwise directions, which in turn move the wings attached to the wing capstans (820, 825) in synchronized opposing directions, that is, in a flapping manner.

FIG. 10 is a rear perspective view of the embodiment of the crank arm and pulley assembly first illustrated in FIG. 8. A motor gear 1000 coupled to the motor 800 may drive the crank gear 805 through a motor reduction gear 1005. As the motor gear 1000 rotates with a constant angular rotation to drive the crank gear 805, the first and second wing capstans (820, 825) are alternately pulled by the first drive linking member 830 (See FIG. 8) and the second drive linking member 835, respectively, at a predetermined non-sinusoidal acceleration from a first sweep angle position to a second sweep angle position (e.g., from a front original position to back sweeping position) and a return force is provided by the first and second crossing synchronization linking members (840, 845) to return the first and second wing capstans (820, 825) to the first sweep angle position to establish a back and forth flapping motion for wings (not shown) that may be connected to the first and second wing capstans (820, 825).

Figure 11:
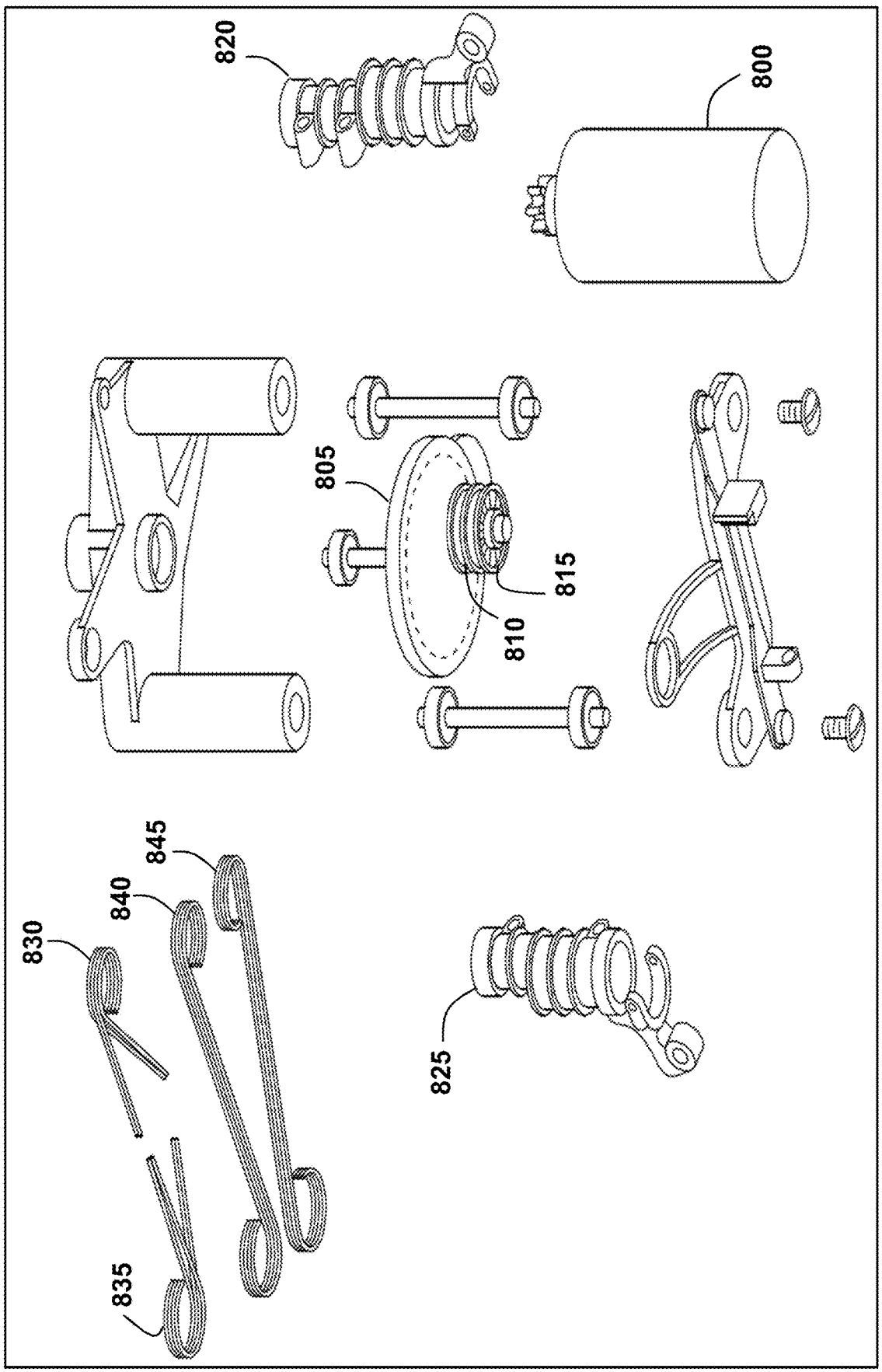
FIG. 11 is an exploded view of the device show in FIGS. 8 and 10.

FIG. 11 is an exploded view of the device show in FIGS. 8 and 10. This figure shows four sets of strings: first and second crossing synchronization strings (840, 845) and first and second drive linking members (830, 835) that may be strings. The first crossing synchronization string 840 may be windably coupled for moving (e.g., pulling) the first wing capstan 820 in a first direction (e.g., clockwise) and the second crossing synchronization string 845 may be windably coupled for moving (e.g., pulling) the first wing capstan 820 in a second (opposite) direction (e.g., counterclockwise). Where the first and second set of synchronization strings (840, 845) cross over each other between the first and second wing capstans (820, 825) such that the first crossing synchronization string 840 operates to move (e.g., pull) the second wing capstan 825 in a first direction (e.g., clockwise) and the second crossing synchronization string 845 operated to move (e.g., pull) the second wing capstan 825 in a second (opposite) direction (e.g., counterclockwise). One of the two sets of drive strings 830 is for moving (e.g., pulling) the first wing capstan 820 in a first direction (e.g., counterclockwise) as a result of the movement of the first or second capstan (810, 815) on the crank gear 805 and the other set of drive strings 835 is for moving (e.g., pulling) the second wing capstan 825 in the first direction (e.g., counterclockwise) as a result of the movement of the other capstan (815, 810), where the action (e.g., pulling) of the first and second drive strings (830, 835) occur opposite of one other (such that when one drive string is pulling a wing capstan to cause its rotation, the other drive string is feeding onto and being received by its respective wing capstan). Mechanism connections may include integral motor mount saddles and an integral control mechanism base.

FIGS. 12A-12F depict the two wing drive capstans that engage the synchronizing strings and the drive strings. The crossing synchronization strings may attach to the pulleys near the control mechanism, and the drive strings may attach near the upper portion of the pulley.

FIG. 12A shows a top view (looking from either the top or from the bottom of the air vehicle, depending on the embodiment) of the flapping mechanism. The flapping mechanism 1200 may include a crank gear 1202 that rotates about a center pivot or axis 1204 and may have one or two (co-axial) capstans 1206 rotatably mounted to the crank gear on a pivot or the axis 1207 at a position off set from the center 1204 of the crank gear 1202. Attached to the crank gear capstans 1206 are two drive linking members that may be drive strings (1208, 1210), each drive string (1208, 1210) running to one of the two wing drive capstans (1212, 1214) (alternatively referred to as "wing capstans") that in turn each move respective wing masts (1216, 1218) extending therefrom, in a back and forth flapping motion as the crank gear 1202 rotates. The drive strings (1208, 1210) operate in a manner where one string is pulling one of the wing drive capstans, then the other drive string is pulling the other wing drive capstan as the crank gear 1202 rotates, with a return force on each of the wing drive capstans (1212, 1214) being applied by one of the crossing synchronization strings (1220, 1222). In this manner, constant angular rotation of the crank gear results in non-constant angular rotation of the first and second wing capstans when the first and second wing capstan are driven by the crank gear.

Each drive string (1208, 1210) is windably received on its respective wing drive capstan (1212, 1214) by a respective drive string pulley portion (1224, 1226) that may have a variable radius that defines a lobe, egg, oval or other non-constant radius shape. The shape of the drive string pulley portions (1224, 1226) functions to both reduce or limit the accelerations of the wing masts (1216, 1218) (and hence the attached wings) at or about the end of each of their flap cycles (e.g., where the wing changes its direction of travel), as well as to maintain a desired and/or sufficient tension on the drive string. In various embodiments the drive strings may elongate to avoid slack. In embodiments with round, or substantially round, drive string pulleys, the drive strings may become slack, adversely affecting the operation of the wing as it flaps and/or imparting vibrations into the flapping mechanism and the air vehicle. However, with lobe or similar shaped pulleys the drive strings are taken up and/or received by the pulley to prevent or limit any slack in the string. Although the drive strings (1208, 1210) are described in terms of strings, they may also be described as cables, bands or simply as "members." Also, although illustrated as having a single strand, each string may consist of a plurality of strands to form the cable, band or member.

Also windably attached to the first and second wing drive capstans (1212, 1214) are the two crossing synchronization strings (1220, 1222) at first and second synchronization pulleys, respectively (1228, 1230). The first and second synchronization pulleys (1228, 1230) may be round (e.g., configured with a constant radius) or may have a non-constant radius where receiving the first and second synchronization strings (1220, 1222).

FIG. 12B is a side view of the flapping mechanism illustrating the two drive linking members and crossing synchronization strings. The first and second drive strings (1208, 1210) may be windably coupled at respective wing drive capstans (1212, 1214). The first wing drive capstan 1212 may have the drive pulley portion 1224 to windably receive the first drive string 1208 and a first sychronization pulley 1228 to windably receive the first crossing synchronization linking member that may be a crossing synchronization linking string 1220. Similarly, the second wing drive capstan 1214 may have the second drive pulley portion 1226 to windably receive the second drive string 1210 and a second sychronization pulley 1230 to windably receive the second crossing synchronization linking string 1222.

Figure 12E:
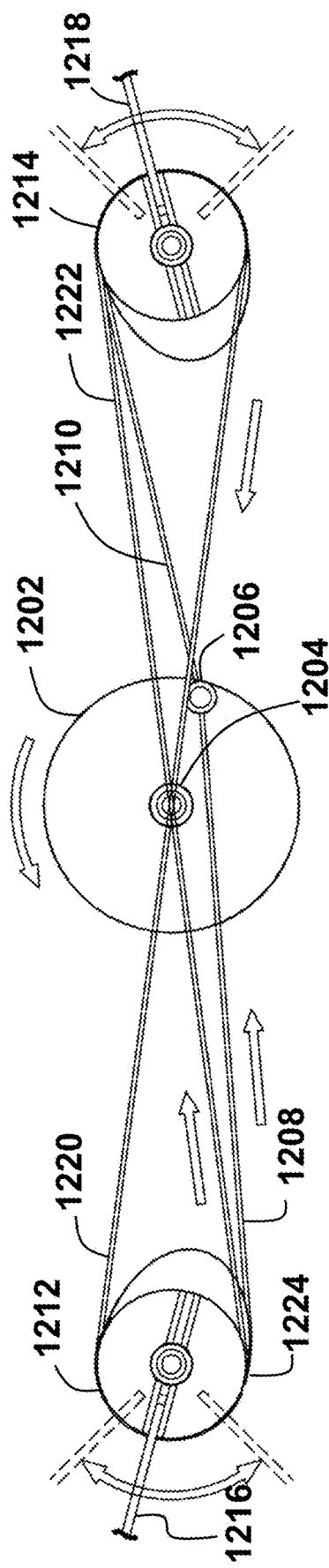
Figure 12F:
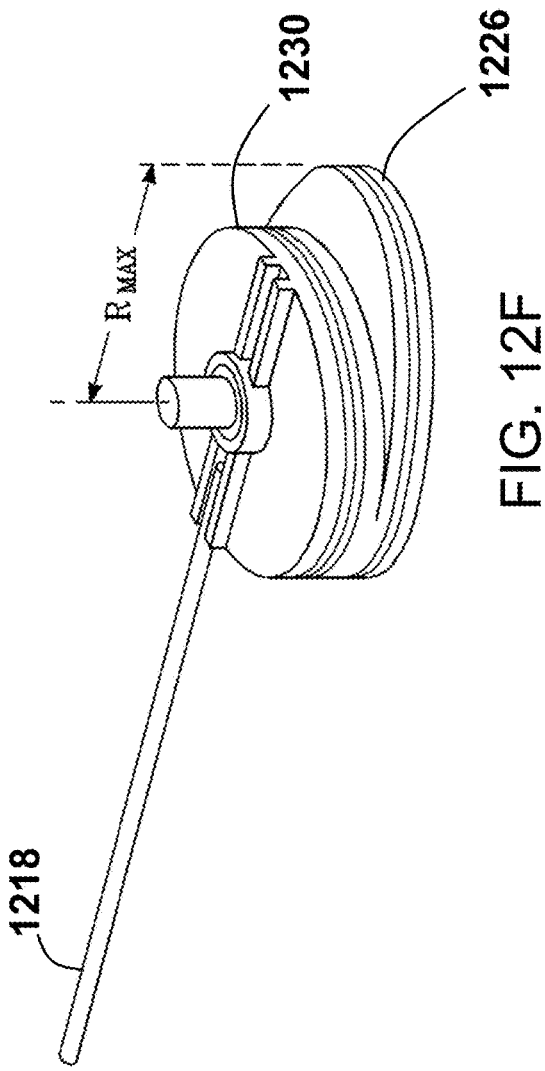

FIG. 12C-12E illustrate different flapping mechanism component positions during operation. As the crank gear 1202 rotates counterclockwise at a constant angular velocity, the second drive string 1210 may be pulled and windably configured on the second wing drive capstan 1224 to rotate it counterclockwise and to both move the second wing mast 1216 in a counterclockwise rotation and to windably pull the first synchronization string 1220. The at least one crank gear capstan 1206 is freely rotatable on the crank gear 1202 and so the second drive string 1210 does not spool around the crank gear 1202 during operation. The first synchronization string 1220 may be windably configured on the second wing drive capstan 1212 to rotate it clockwise resulting in clockwise rotation of the first wing mast 1216. The crank gear 1202 transitions from pulling the second drive string 1210 to pulling the first drive string 1208 as the second drive string 1210 is received at a maximum radius Rmax (See FIG. 12F) of the second variable-radius drive pulley portion 1226. The second wing capstan 1214 changes rotation direction (e.g., to a clockwise rotation) in response to the crank gear capstans now pulling the first drive string 1208. Similarly, the first crossing synchronization string 1220 begins to spool onto the first wing capstan 1212 in response to counterclockwise rotation of the first wing drive capstan 1212 resulting in a change of the rotation direction (e.g., to a clockwise rotation) of the second wing capstan 1214.

In embodiments, the pulley portions for the synchronization strings may be round in shape (constant radius), such that the tension of the synchronization strings, and the force exerted and speed imparted onto the wing drive capstan by the synchronization strings remain constant (or at least substantially constant) throughout the travel (rotation) of the capstan. In such embodiments, each of the two pulleys for each set of synchronization strings are the same (or at least substantially the same) in size and shape. In contrast, in embodiments, the pulley portions for the drive strings may be shaped in a manner that provides that the tension on the drive strings, as well as the force exerted and speed imparted onto the wing drive capstan by the drive strings vary through the travel (rotation) of the capstan. This variable tension, force and speed can be achieved in some embodiments by varying the radius of the drive pulley about the capstan (i.e. a "variable-radius" capstan), such that the drive pulley has an oval or egg shape. With a variable radius shape the speed and the acceleration of the wings, which may be attached to the drive capstan pulleys, may be varied with the position and movement of the wing drive capstans. In at least one embodiment, the drive pulleys may be shaped so that when the wings are near or at the end of their travel in the flapping motion, that is, where they change direction of travel, that the radial distance from the center of rotation of the drive capstan pulley to the surface of the drive pulley (e.g., where the drive string is received by the capstan pulley), is at its greatest, which results in reducing the speed and the accelerations of the wing at and about the end of the wing travel. Such reduced speed and accelerations of the wings function to conserve energy, reduce noise, wear and vibrations. In addition, by shaping the drive pulley to have a larger radial distance at the end of the wing drive capstan and wing travel, additional tension may be applied by the drive pulley to the drive strings, which in turn functions to prevent or at least reduce slack in the drive string, which in turn improves the performance of the device by reducing accelerations of the drive capstan and wing and/or slapping or snapping of the drive string.

Figure 13A:
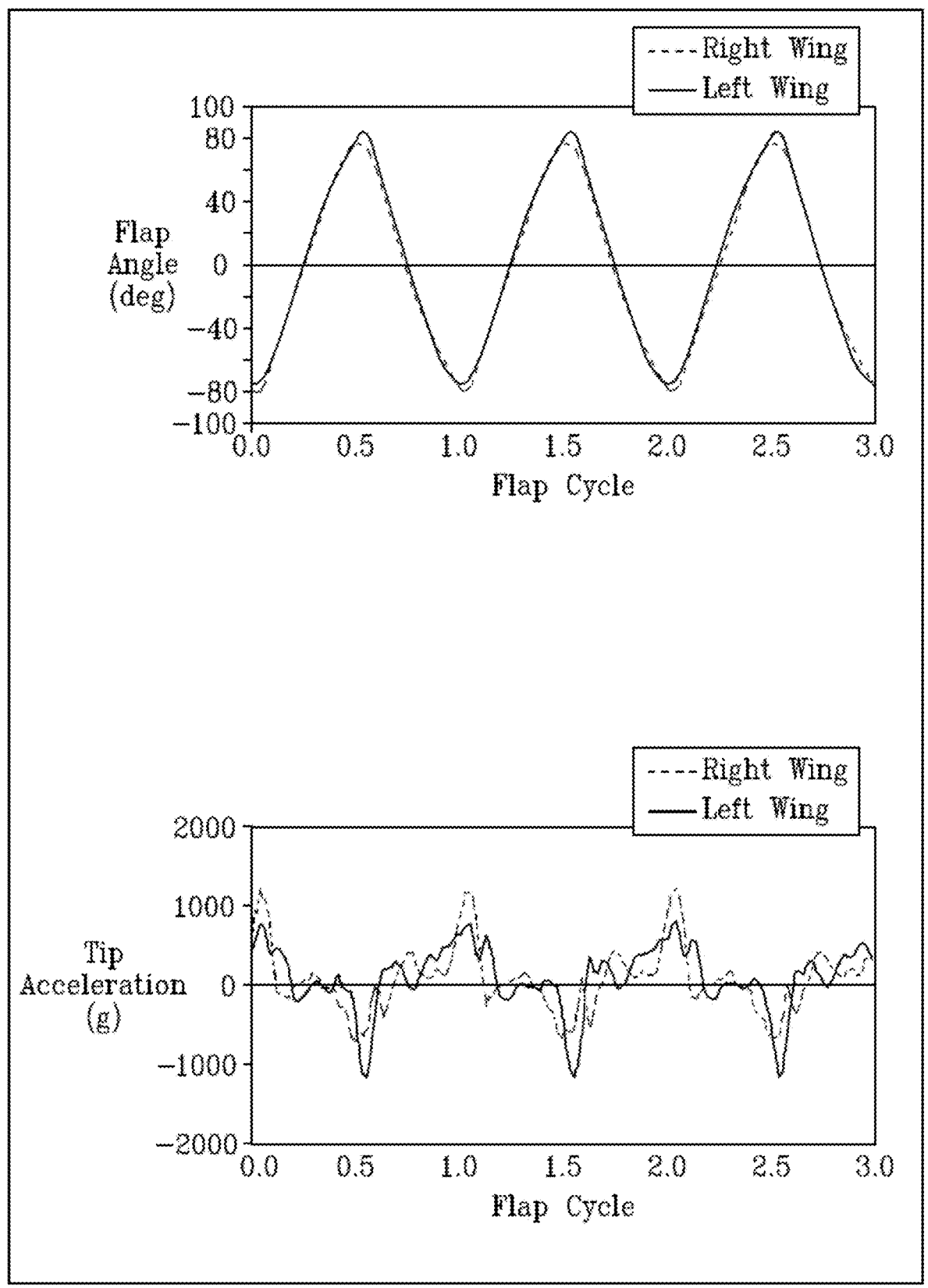
FIGS. 13A, 13B and 13C are exemplary graphs of flap angle (degrees) and tip accelerations (g) verses flap cycle to illustrate the effects of the variable-radius drive pulley portions on wing position and acceleration.
Figure 13B:
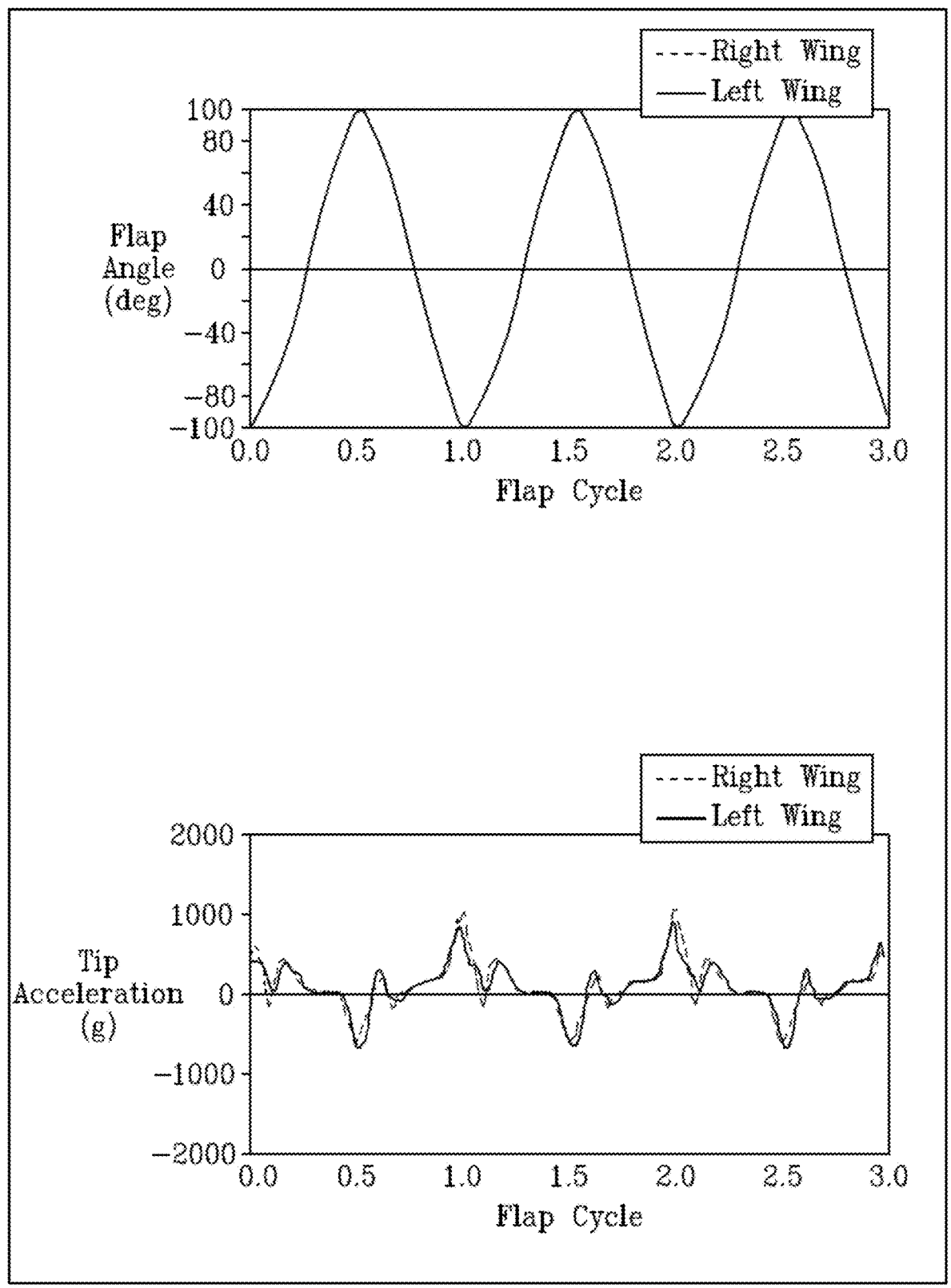
Figure 13C:
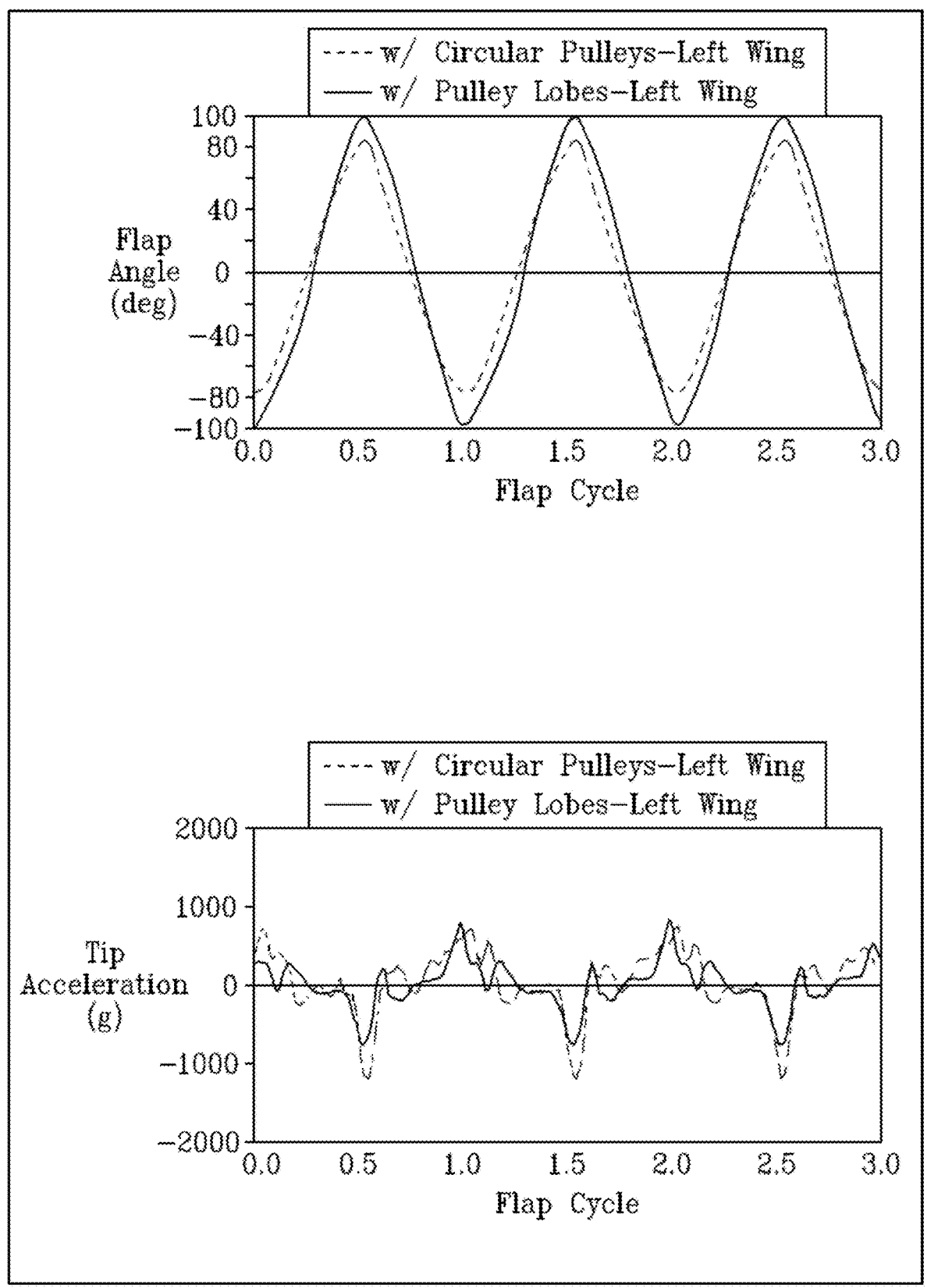

FIGS. 13A-C are example graphs of flap angle (degrees) and tip acceleration (g) verses flap cycle to illustrate the effects of the variable-radius drive pulley portions disposed on the wing capstans, in these example graphs lobe-shaped pulleys, on wing position and acceleration. For these examples, synchronization strings are also positioned between the two wing capstans with the synchronization strings crossing over therebetween such that they function to cause the wing capstans (and thus the wings) to move in opposite directions to create a flapping motion. The synchronization strings are received by round shaped pulley portions of the wing drive capstans. In other embodiments, other shapes of these pulleys may be used. In the embodiment shown, the synchronization strings do not contact or otherwise engage the crank gear, instead they pass over the crank gear as shown. FIG. 12B shows a side view of an embodiment of the flapping mechanism.

In FIG. 13A, the left and right wing angles and tip accelerations are shown for an embodiment with circular shaped drive string pulleys on the wing drive capstan. As can be seen the right wing experiences slack string on rear turn-around (negative flap angle) and vice versa for the left. The slack string causes a large jerk on the wing where it may suddenly tighten, and thereby result in a large acceleration spike. Because the acceleration spikes are experienced by one wing at a time, alternating yaw moments vibrate the air vehicle. FIG. 13B shows the left and right wing angles and tip accelerations graphs for an embodiment with lobe-shaped drive string pulleys on the wing drive capstan. The pulley lobes provide tension to the string during the turn-around, and the string is not allowed to go slack. The result is a more even flap profile and more closely offsetting accelerations. FIG. 13C shows for the left wing, a comparison between the embodiment with lobe-shaped drive string pulleys and the embodiment with circular shaped drive string pulleys. The graphs (FIGS. 13A-C) show the reduction in tip accelerations with the use of the lobe-shaped drive string pulleys (FIGS. 12A-F), even when the stroke amplitude is larger.

Figure 14A:
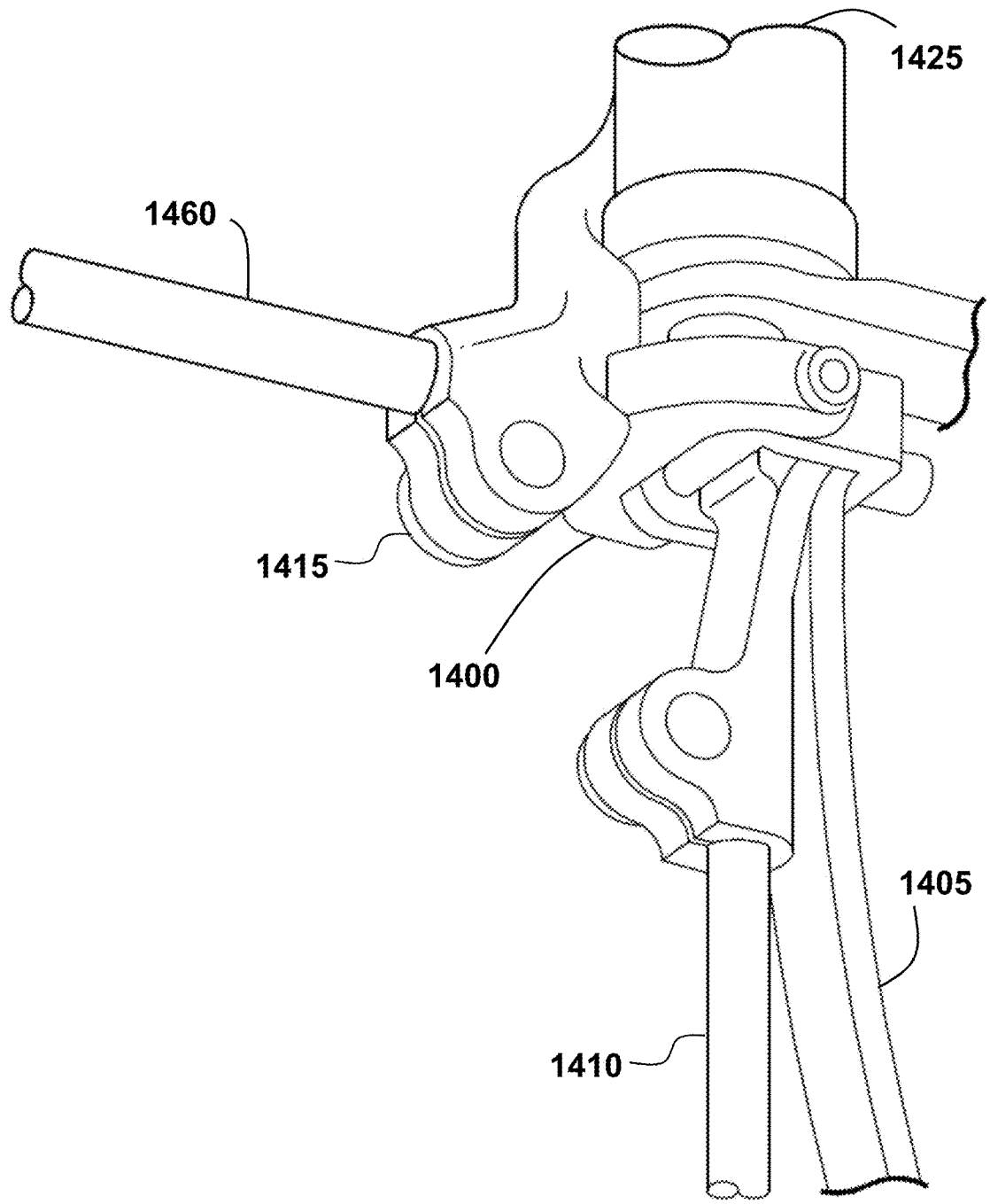
FIGS. 14A and 14B illustrate one embodiment of a coupling configuration for coupling wing masts to respective wing root spars and boom vangs to enable yaw control of a flapping mechanism.
Figure 14B:
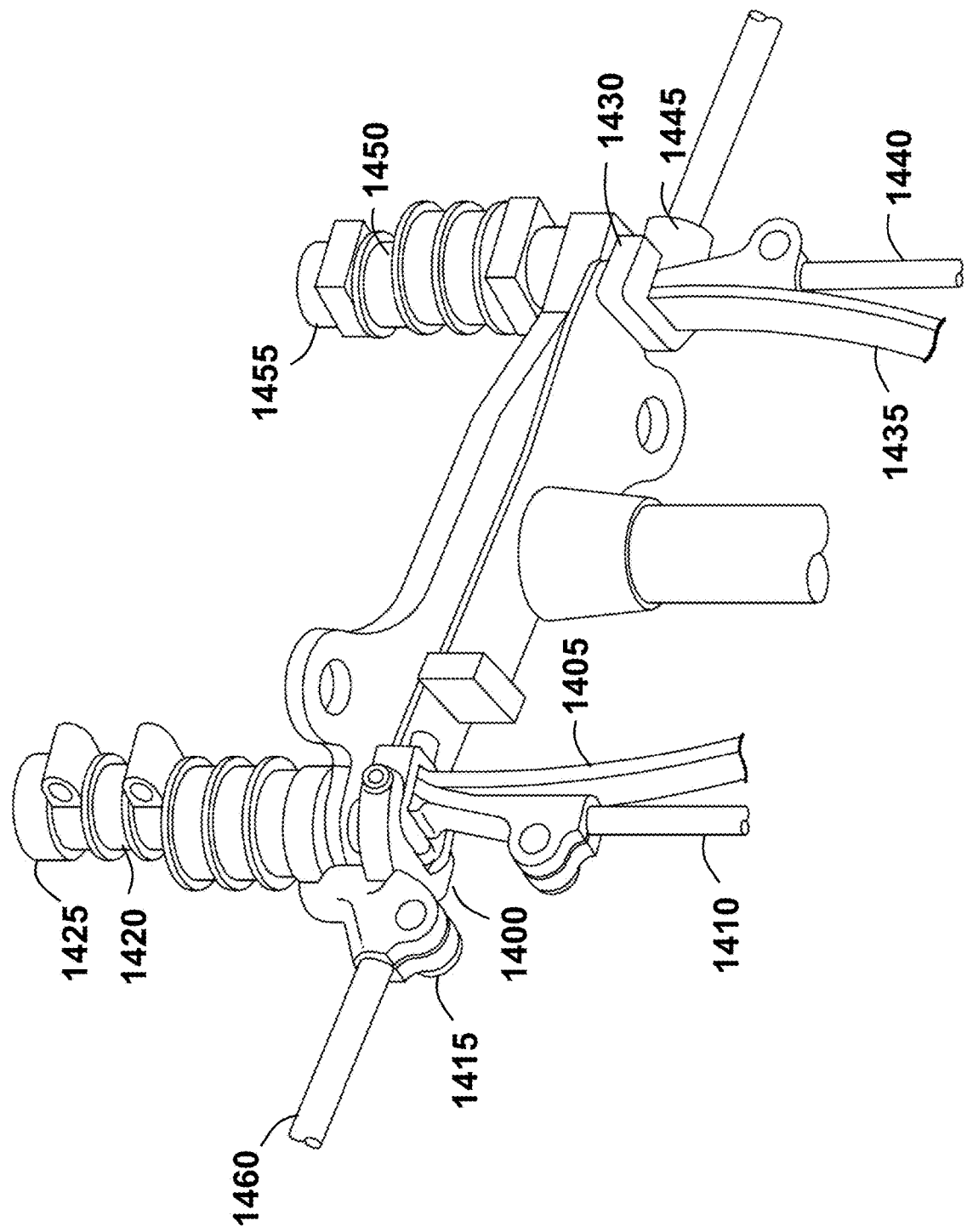

FIGS. 14A and 14B illustrate one embodiment of a coupling configuration for coupling wing masts to respective wing root spars and boom vangs to enable yaw control of a flapping mechanism. In FIG. 14A, a universal joint 1400 may be positioned between the boom vang 1405/root spar 1410 structure and the wing mast mount structure 1415, where the wing mast mount structure 1415 may be coupled to a variable-radius drive pulley portion 1420 (FIG. 14B) on a wing drive capstan 1425. The universal joint 1400 allows for two axis of rotation for the boom vang 1405 and the root spar 1410, where the boom vang 1405 maintains alignment to the root spar 1410. In FIG. 14B, a second universal joint 1430 may be positioned between a second boom vang 1435/root spar 1440 structure and a second wing mast mount structure 1445. The second wing mast mount structure 1445 may be coupled to a variable-radius drive pulley portion 1450 (FIG. 14B) on a second wing drive capstan 1455. A wing mast 1460 is coupled to the wing mast mount structure 1415 to rigidly support a wing (not shown).

Figure 15B:
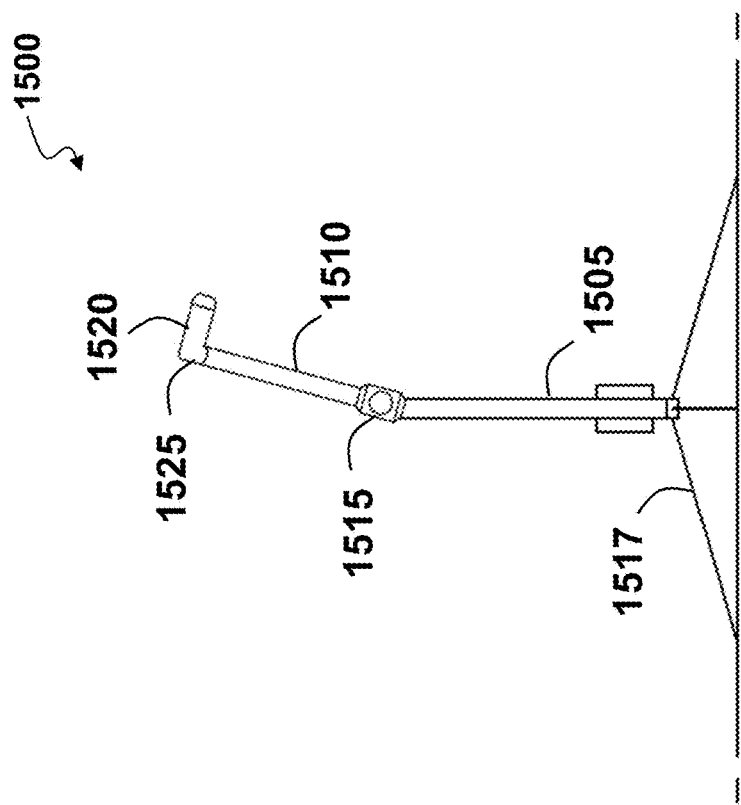
FIGS. 15A and 15B illustrate one embodiment of a pitch-tiltable camera coupled to the top of an air vehicle frame that has a lower body gimbal system configuration.
Figure 15A:
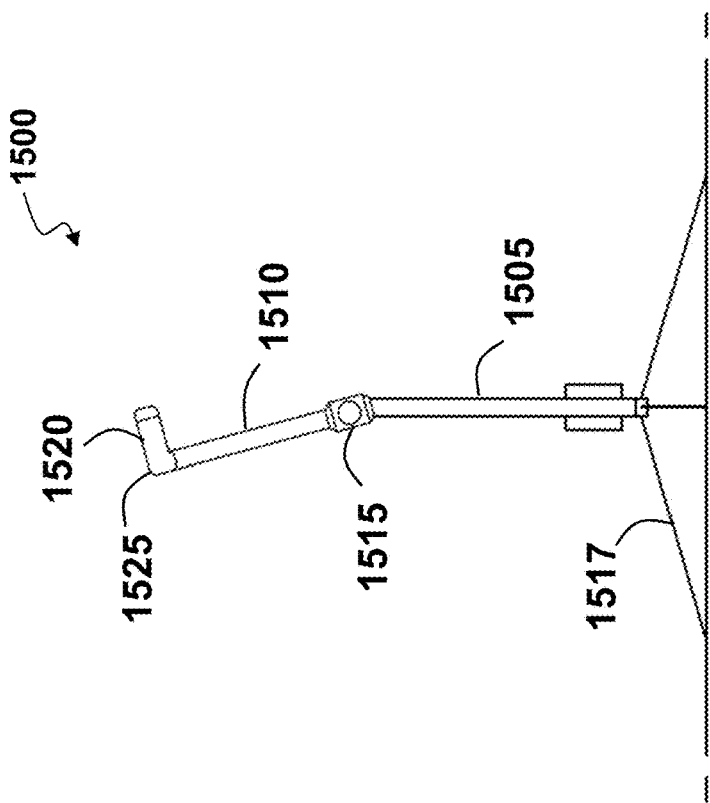

FIG. 15 illustrates one embodiment of a pitch-tiltable camera coupled to the top of an air vehicle frame 1500 that has a lower body gimbal configuration such as that illustrated in FIGS. 6A and 6B. A rotatable boom vang support 1505 may be rotatably coupled to an upper spine 1510 through a gimbal joint 1515. A landing gear 1517 may be coupled to the boom vang support. A camera 1520 may be positioned at or near the top 1525 of the structure of the air vehicle 1510. Using the gimbal joint 1515 (alternately referred to as a "pitch gimbal"), the camera may be tilted to different angles. That is, when the air vehicle frame 1500 is on the ground (perching) and the landing gear 1517 is fixed so that the lower body gimballing becomes static and the upper body moves about the pitch gimbal 1515, then the camera 1520 may be tilted as the upper spine 1510 moves. In one embodiment, a roll gimbal (not shown) may be added to the upper body and to enable the camera to be rolled. Also, a camera yaw control capability (not shown) may be added to the pitch and roll capability to enable full pan, tilt, roll controls to the camera. The yaw control may be a pivot with a cable to move the camera about the pivot, where the cable is actuated by the air vehicle's yaw control servo.

Figure 16C:
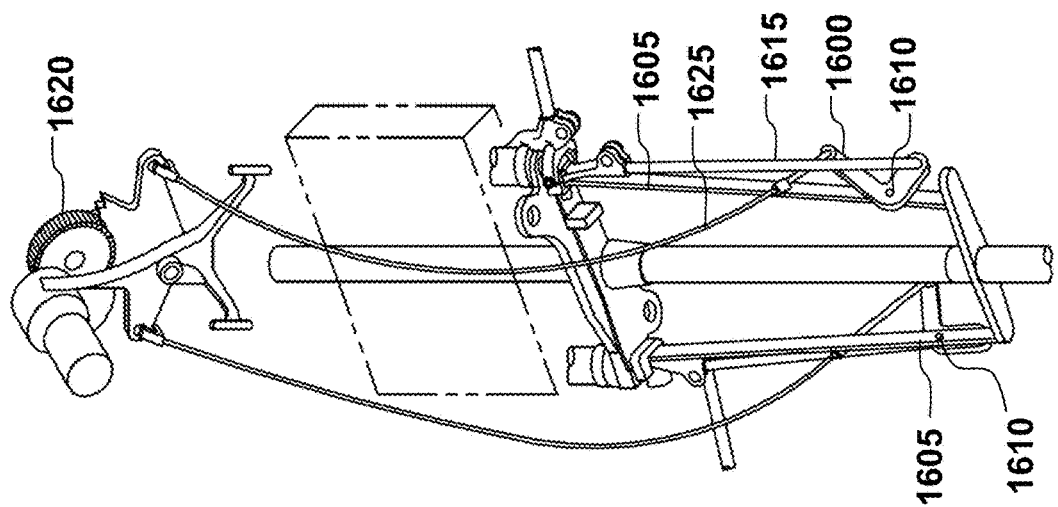
FIGS. 16A, 16B, and 16C illustrate one embodiment of a yaw control arrangement and structure thereof for an air vehicle that includes a yaw servo driving push-pull cables through respective cable guides.
Figure 16B:
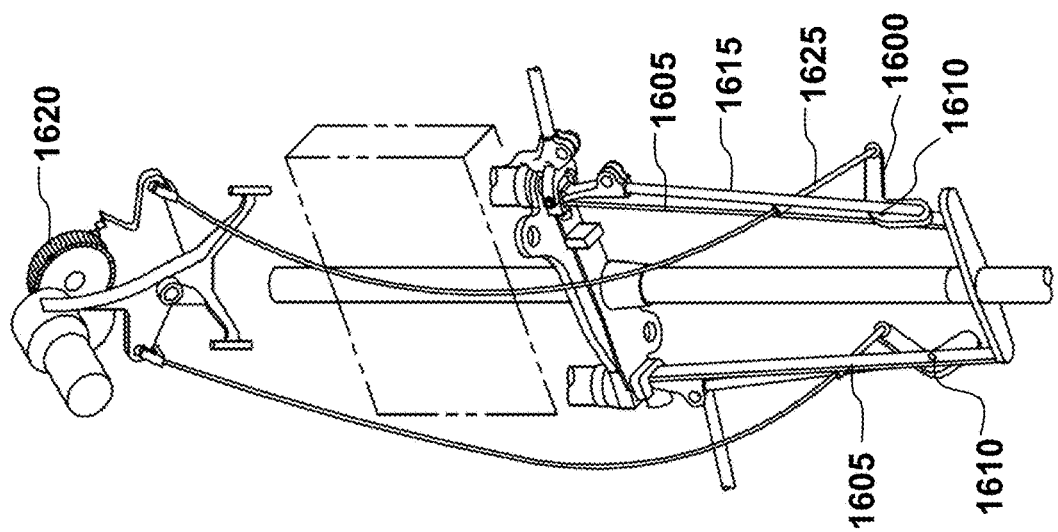
Figure 16A:
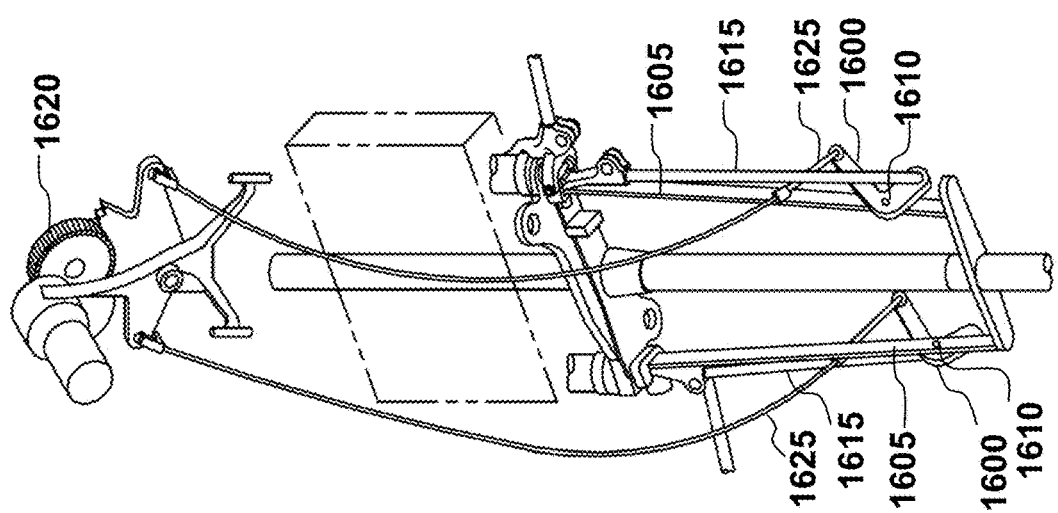

FIGS. 16A-C illustrate an embodiment of a yaw control arrangement and structure thereof for an air vehicle. FIG. 16A depicts the yaw control command neutral position (e.g for hovering, vertical, forward/backward, or rolling flight without yaw). The yaw control structure components for each wing (not shown) may include a lever arm 1600 mounted to a boom vang 1605 at a pivot point 1610 such that the lever arm 1600 rotates about the pivot point 1610. One end of the lever arm 1600 may be attached and/or in contact with a wing root spar 1615 such to deflect it relative to the boom vang 1605 and about the universal joint (as set forth above) as the lever arm 1600 is pivoted. An opposing end of the lever arm 1600 may be attached to an actuator yaw servo 1620 through a push/pull cable 1625. FIG. 16B depicts a counterclockwise or left yaw rotation (as viewing the air vehicle from above), as the lever arms 1600 are deflected in opposite directions from one another. Different turning of the flap assemblies for each wing with respect to the drive assembly results in yawing of the air vehicle. FIG. 16C depicts a clockwise or right yaw rotation (as viewing the air vehicle from above), as the lever arms 1600 are deflected in opposite directions from one another, and opposite from that shown in FIG. 16B.

FIGS. 17A-C depict an embodiment for providing yaw control of a air vehicle frame using lever arms coupled to respective pushrods to drive respective drive wing root spars. For each wing, a lever arm (1700, 1705) is mounted to a boom vang (1710, 1715) at a pivot point (1720, 1725) such that the lever arm (1700, 1705) may rotate about the pivot point (1720, 1725). One end of each lever arm (1700, 1705) may be attached and/or in contact with a respective wing root spar (1730, 1735) such to deflect it relative to its respective boom vang (1710, 1715). Each boom vang (1710, 1715) is coupled to a respective pitch/roll control arm 1750 that has a central pivot through respective ball sockets having a steel hinge bushing through their centers (1755, 1760) to allow the respective pitch/roll control arms to rotate in relation to the boom vangs (1710, 1715). Each wing has a respective pushrod (1765, 1770) to drive respective drive wing root spars (1730, 1735) through respective lever arms (1700, 1705).

In particular, FIG. 17A shows the root spars (1730, 1735) actuated in a manner to produce a right yaw of the air vehicle. FIG. 17B shows the root spars generally aligned with their respective boom vangs (1710, 1750) to produce no yaw or neutral yaw of the air vehicle. FIG. 17C shows actuation of the root spars (1730, 1735) in a manner to produce a left yaw of the air vehicle.

Figure 18A:
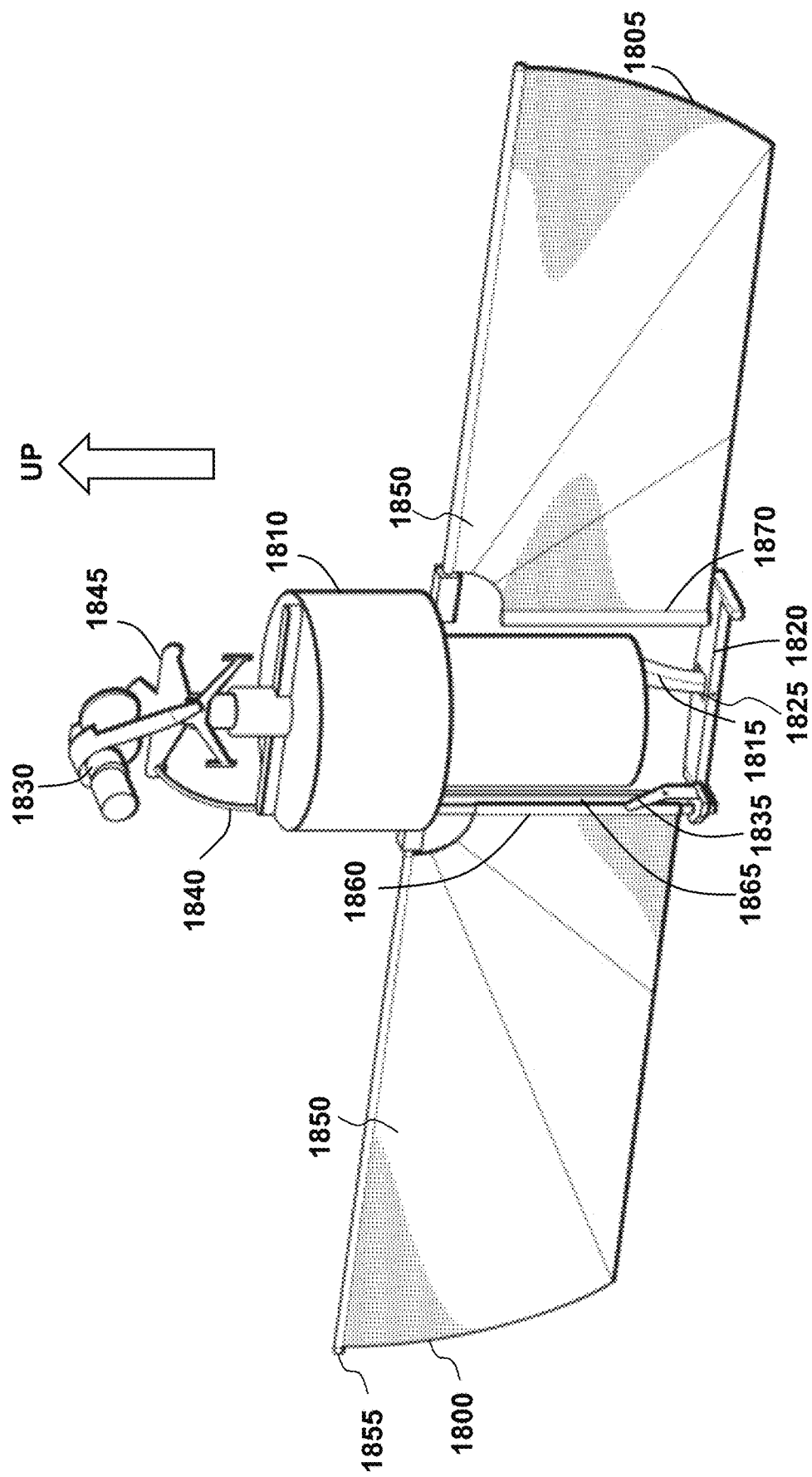
FIGS. 18A and 18B are front and rear perspective views, respectively, illustrating one embodiment of an integrated boom vang system driven by a yaw servo through pushrods to provide yaw control of a flapping mechanism.
Figure 18B:
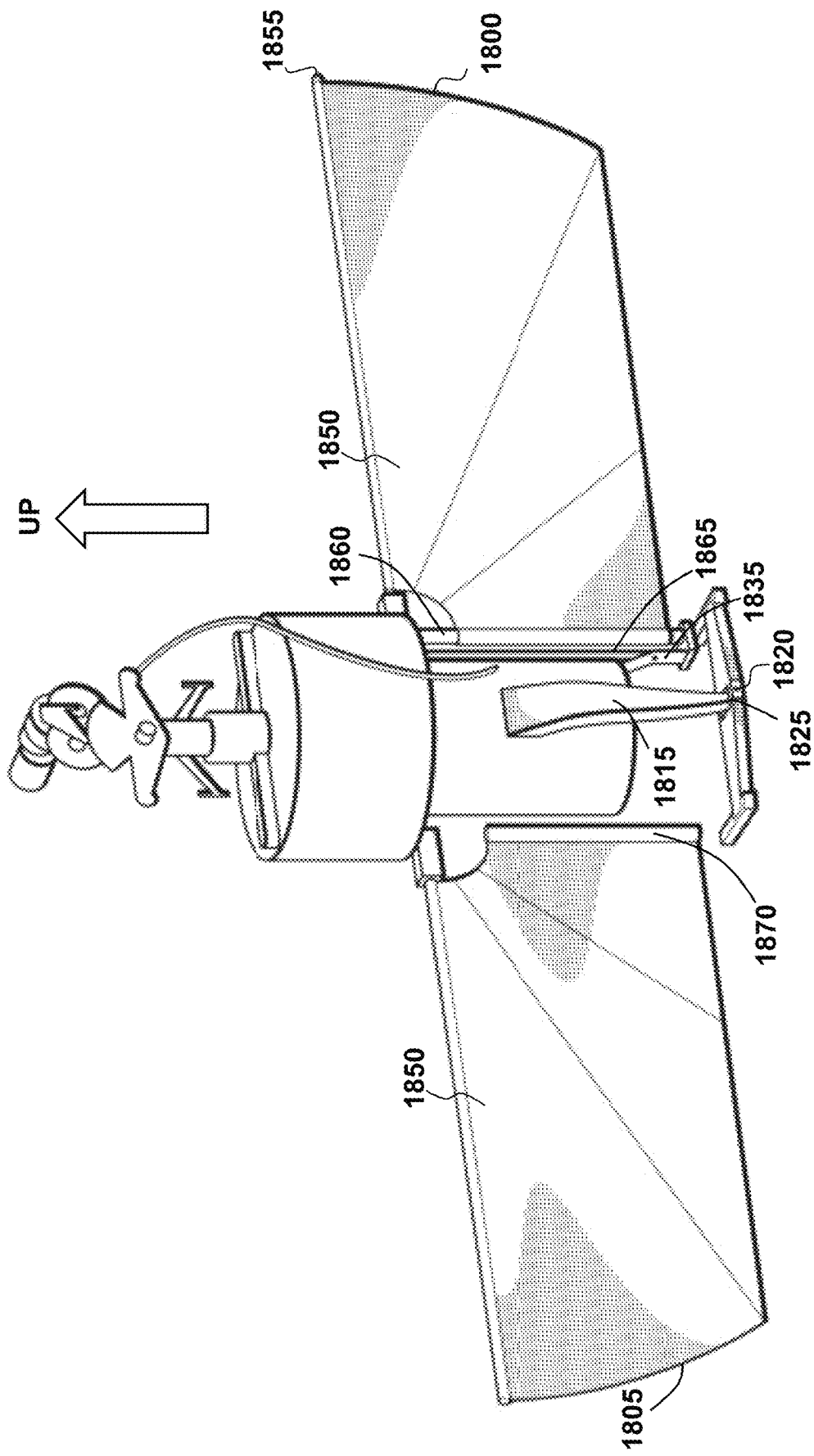

FIGS. 18A and 18B illustrate one embodiment of an integrated boom vang system driven by a yaw servo through pushrods to provide yaw control of a flapping mechanism. Two wings (1800, 1805) are coupled to a flapping mechanism 1810, with a lower arcuate spine 1815 coupled to an attitude control arm 1820 through a control gimbal 1825. A yaw servo 1830 drives a lever arm 1835 through a pushrod 1840 and yaw arm assembly 1845. Referring to the starboard wing 1800, a fabric portion 1850 is supported by a wing mast 1855 to establish a leading edge, and a root spar 1860 supplements structural support for the fabric portion 1850. The starboard wing 1800 is rotatably connected to a boom vang 1865 through the lever arm 1835. The port wing 1805 is illustrated without a root spar, boom vang, lever arm and push rod to better illustrate the fabric sleeve spar tube 1870 used to receive its respective root spar (not shown). As the pushrod 1840 drives the lever arm 1835, the attitude control arm is caused to rotate to enable yaw control for the flapping mechanism 1810.

Figure 19A:
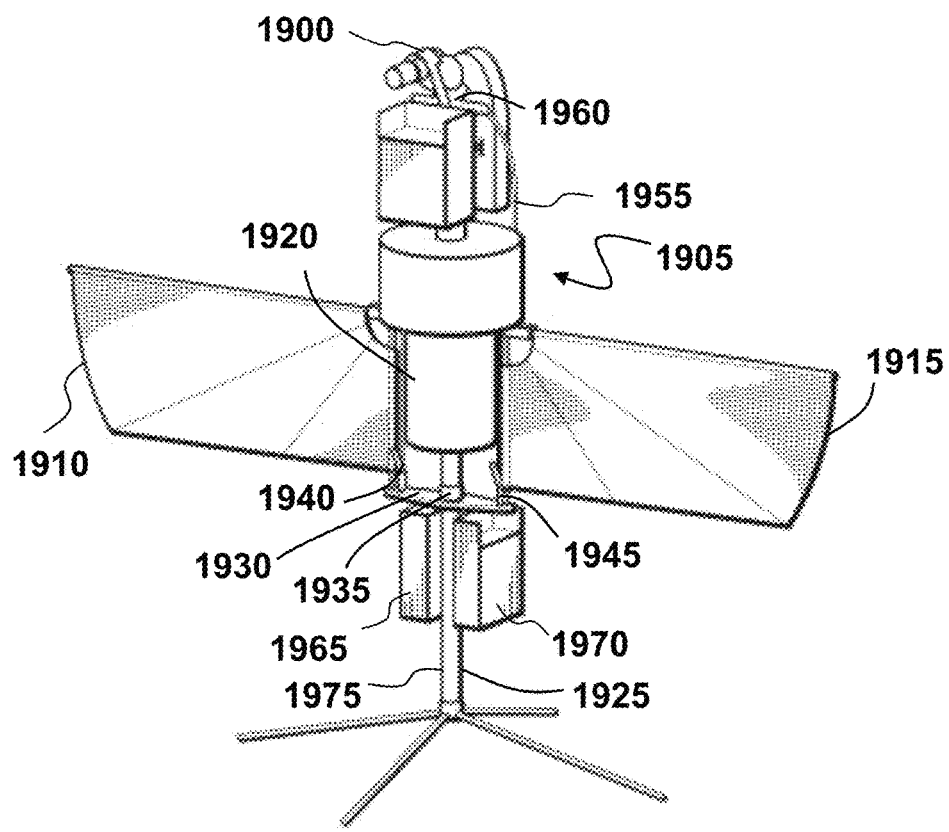
FIGS. 19A and 19B are front and rear perspective views of an air vehicle frame having a yaw control system driving a lower body gimbal system and supporting a plurality of batteries.
Figure 19B:
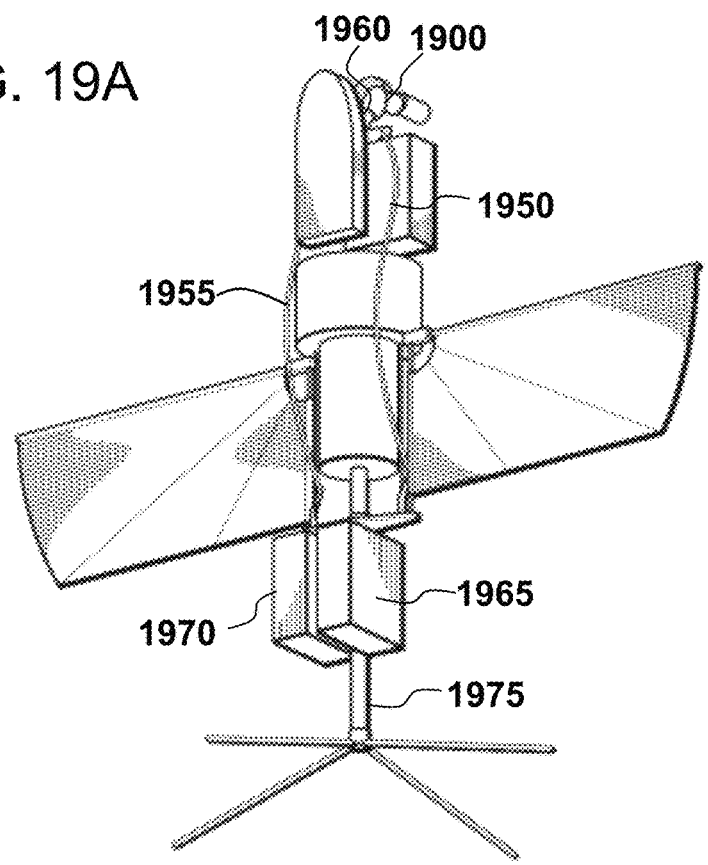

FIGS. 19A and 19B illustrate a yaw control system driving a lower body gimbal system and supporting a plurality of batteries. A yaw servo 1900 may be positioned at or near the top of the vehicle 1905 and projecting to the back of the vehicle (to the right of the image). Two wings (1910, 1915) are coupled to a flapping mechanism 1920, with a boom vang support 1925 coupled to an attitude control arm 1930 through a control gimbal 1935. The yaw servo 1900 drives lever arms (1940, 1945) through respective pushrods (1950, 1955) and yaw arm assembly 1960 to provide yaw functionality of the vehicle. Two batteries (1965, 1970) are coupled to a lower end of the boom vang support 1925. A tail portion 1975 supports the vehicle when landed.

Figure 20A:
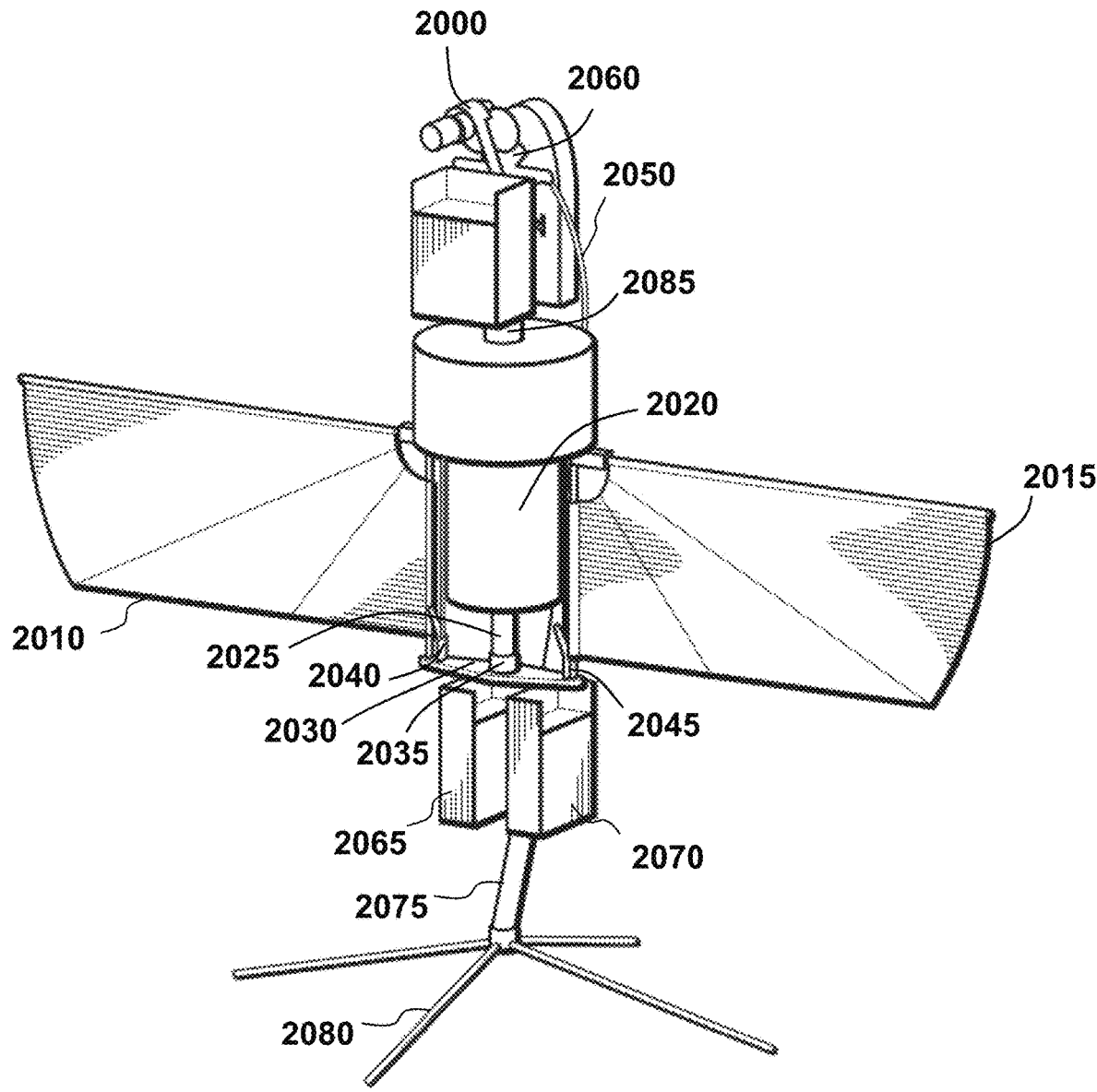
FIGS. 20A and 20B are front and rear perspective views of another embodiment of an air vehicle frame having a yaw control system driving an integrated boom vang system.
Figure 20B:
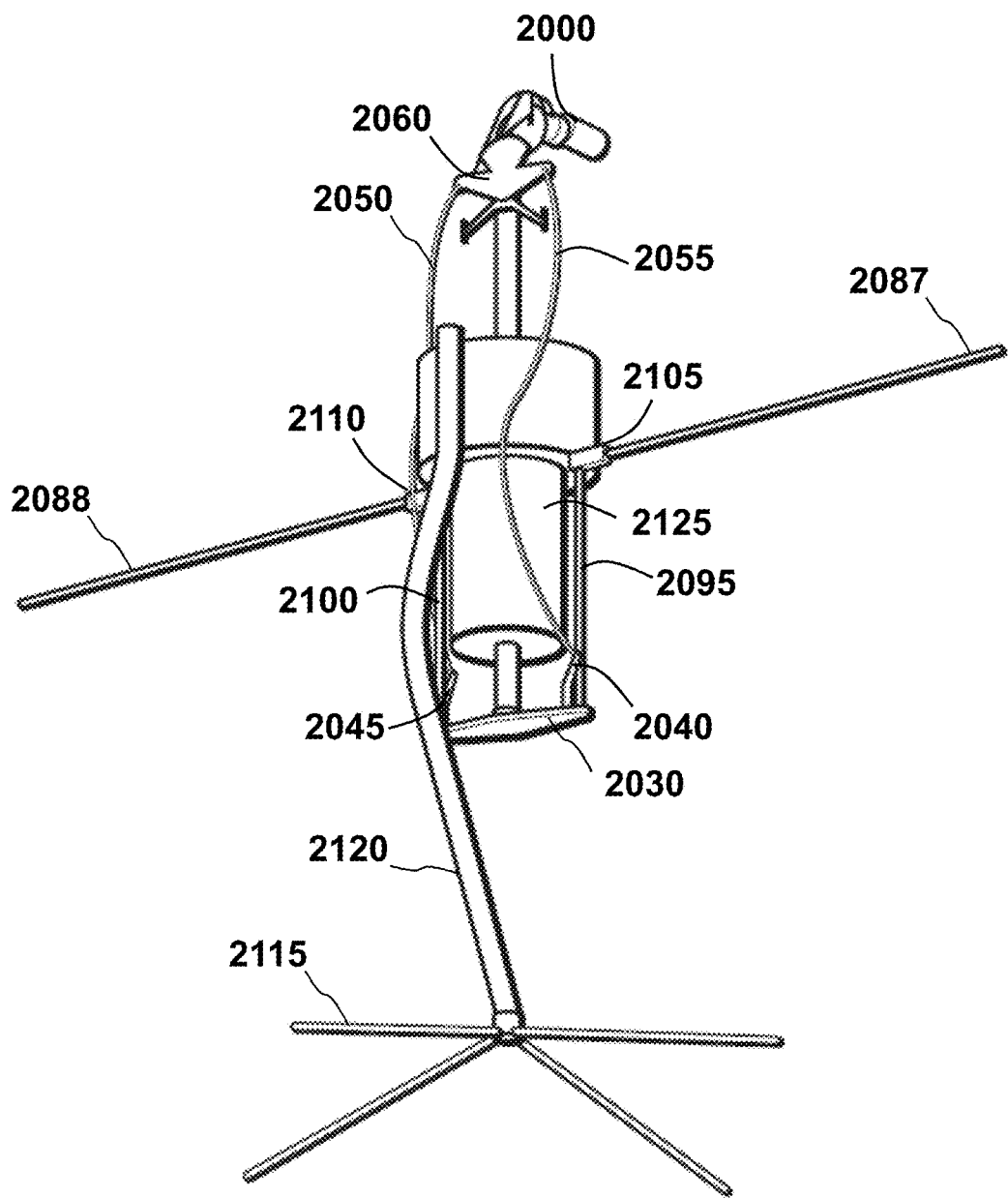

FIGS. 20A and 20B illustrate another embodiment of a yaw control system to drive an integrated boom vang system. In FIG. 20A, a yaw servo 2000 may be positioned at or near the top of the vehicle 2005 and projecting to the back of the vehicle (to the right of the image). Two wings (2010, 2015) are coupled to a flapping mechanism 2020, with a boom vang support 2025 coupled to an attitude control arm 2030 through a control gimbal 2035. The yaw servo 2000 drives lever arms (2040, 2045) through respective pushrods (2050, 2055) and yaw arm assembly 2060 to provide yaw functionality of the vehicle. Two batteries (2065, 2070) are coupled to a lower end of a lower arcuate spine 2075 extending from a proximal end of a tail portion 2080 outwardly to a position above and adjacent to a gimbal joint (not shown), with the gimbal joint connecting an upper spine 2085 to the rotatable boom vang support 2025.

In FIG. 20B, the wing material has been removed and a rear perspective view provides a better view of the starboard and port pushrods (2050, 2055) coupled to the starboard and port lever arms (2040, 2045), respectively. Wing masts (2087, 2088) are exposed and may be coupled to respective boom vangs (2095, 2100) through respective universal joints (2105, 2110). As the starboard pushrod 2055 selectively pushes and pulls the starboard lever arm 2040, the port pushrod 2050 would pull and push the port lever arm 2045 resulting in the attitude control arm 2030 rotating in clockwise and counterclockwise directions, respectively, (viewed from below) to enable yaw control for the flapping mechanism 2125. Four tail portions 2115 may be coupled to a tail post 2120 to support the vehicle when landed.

Figure 21A:
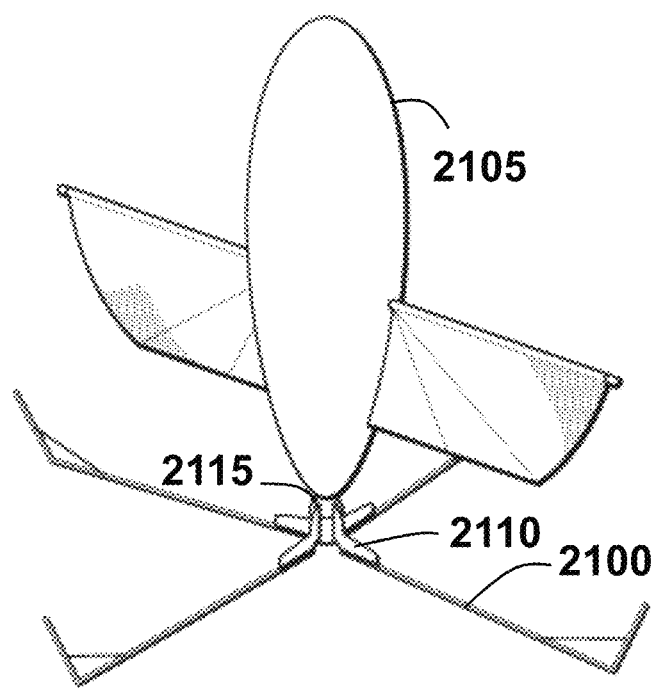
FIGS. 21A-21D are perspective views of one embodiment of a plurality of tail elements that may fold toward a center axis of an air vehicle after taking off from a surface.
Figure 21B:
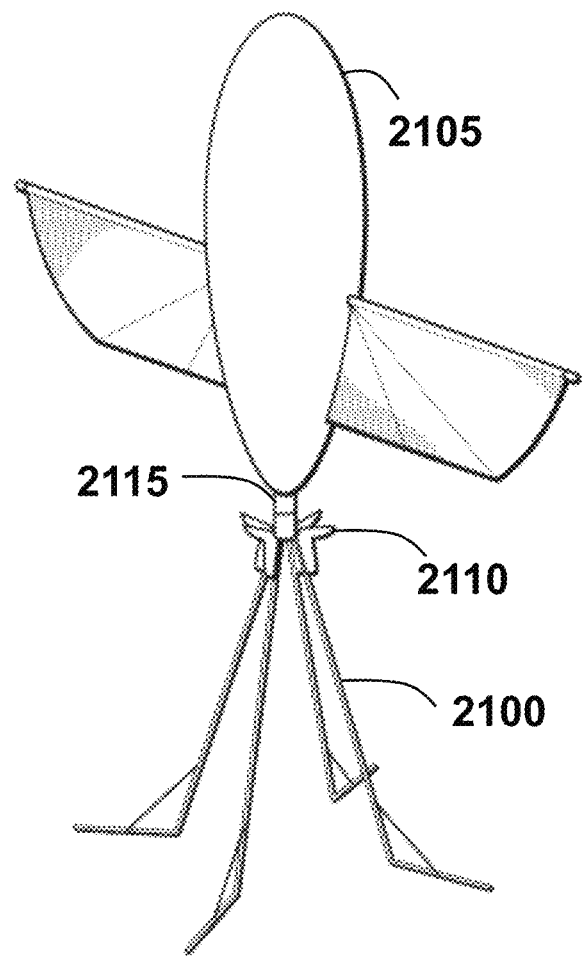

FIGS. 21A and 21B depicts an embodiment of an air vehicle having four tail elements that may reorient toward a center of the vehicle axis as the vehicle lifts from a surface. In FIG. 21A, a plurality of tail elements 2100, four elements in the illustrated embodiment, may each be rotatably coupled to a flapping mechanism 2105 through a hinge assembly 2110 and tail post 2115. As illustrated in FIG. 21B, as the air vehicle becomes airborne and leaves its landing surface, the plurality of tail elements 2100 may each rotate toward a center of the vehicle axis.

Figure 21C:
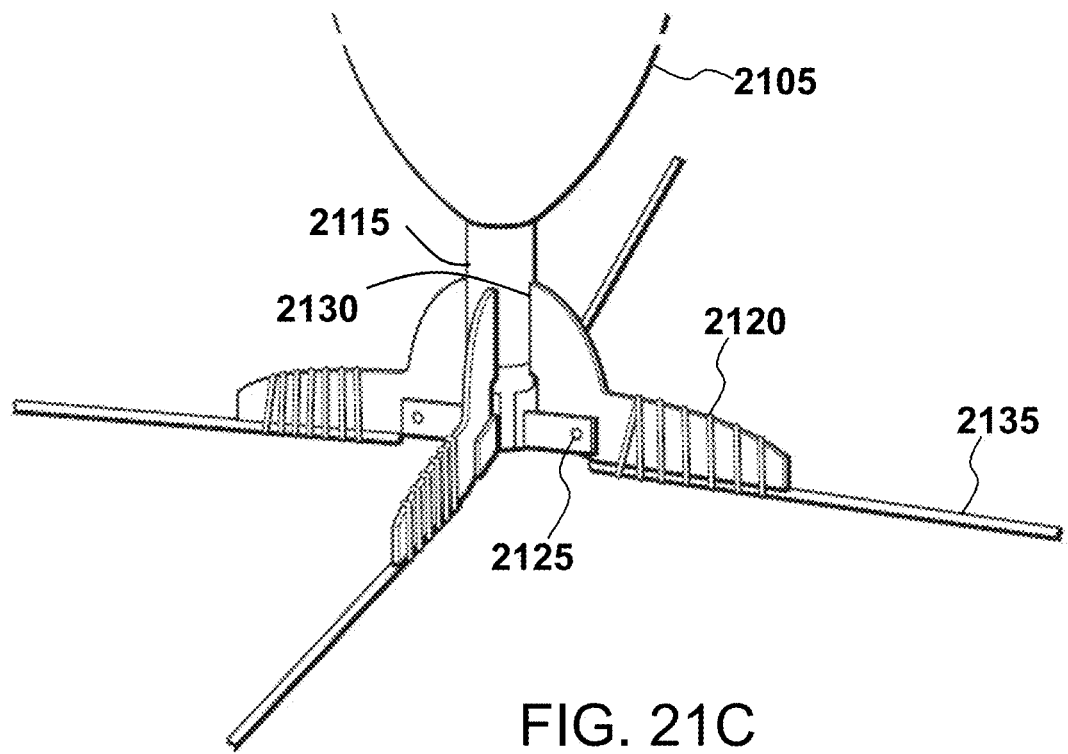

FIG. 21C depicts a landed configuration for the hinge assembly and a proximal portion of the plurality of tail elements first illustrated in FIGS. 21A and 21B. Each tail element may have a hinge 2120 rotatable about a pin 2125, with hinge 2120 having a hinge stop surface 2130 abutting the tail post 2115 when in the air vehicle is landed. A skid 2135 extends horizontally from the hinge 2120 so that a clockwise rotational moment applied by the flapping mechanism 2105, such as if the flapping mechanism is leaning toward the skid 2135, results in compression of the tail post 2115 on the hinge stop surface 2130, tension in the hinge 2120 at the pin 2125 and compression of the skid 2135 against the landing surface to counteract the rotation moment applied by the flapping mechanism 2105 to prevent the air vehicle from falling over.

Figure 21D:
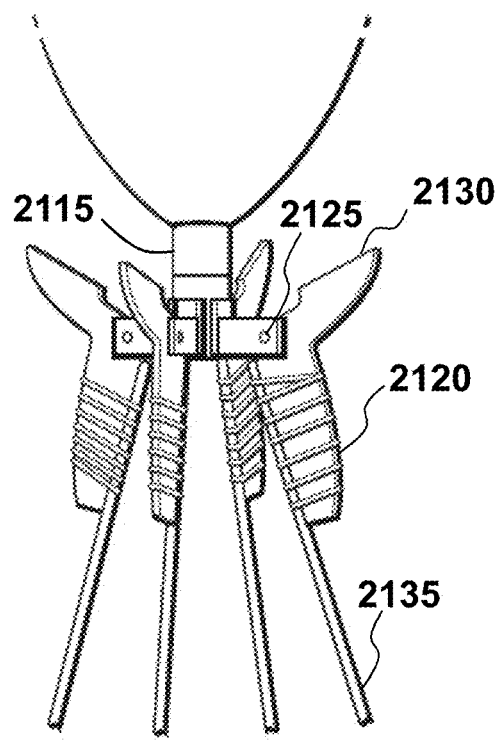

FIG. 21D illustrates the hinge assembly and the proximal portion of the plurality of tail elements illustrated in FIG. 21C in an "in flight" configuration. As the vehicle lifts from the landing surface and the skid 2135 loses full contact with the landing surface, the hinge 2120 and skid 2135 assembly is pulled by gravity to rotate about the pin 2125 to reorient toward a center of the vehicle axis and the hinge stop surface 2130 looses contact with the tail post 2115.

Figure 22A:
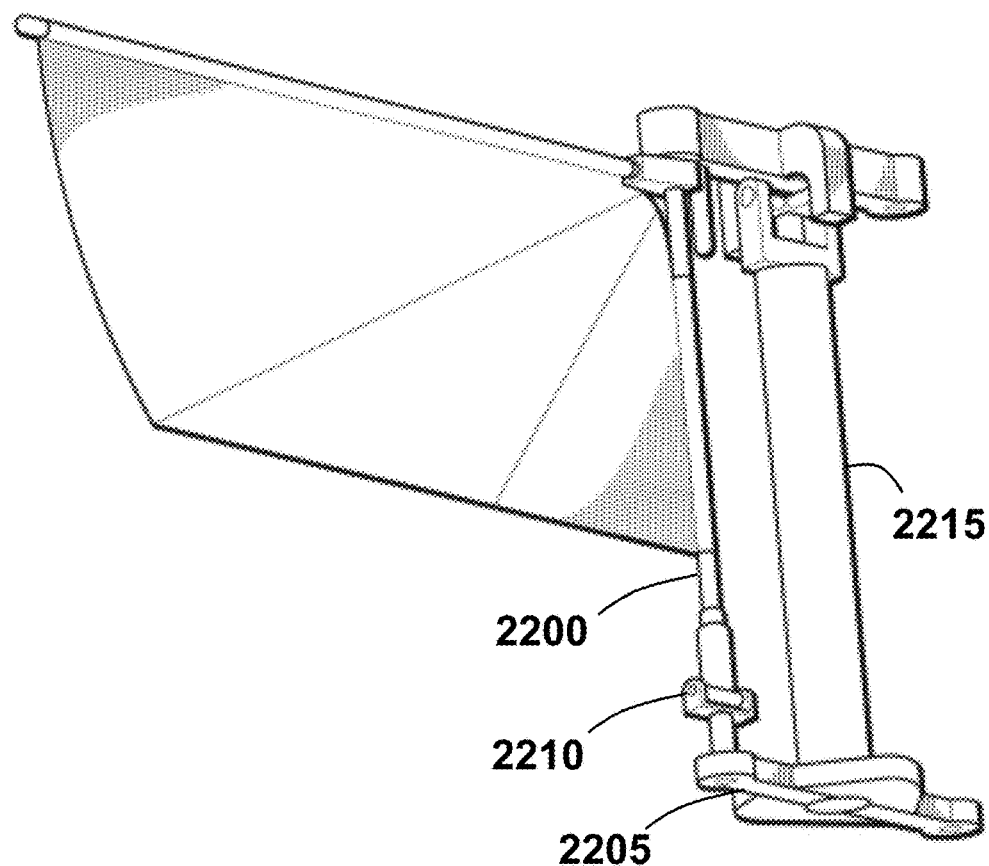
FIGS. 22A, 22B, and 22C are rear perspective views of a lower body gimbal system having a root spar coupled to an attitude control arm through a universal joint to provide yaw control of an air vehicle.
Figure 22B:
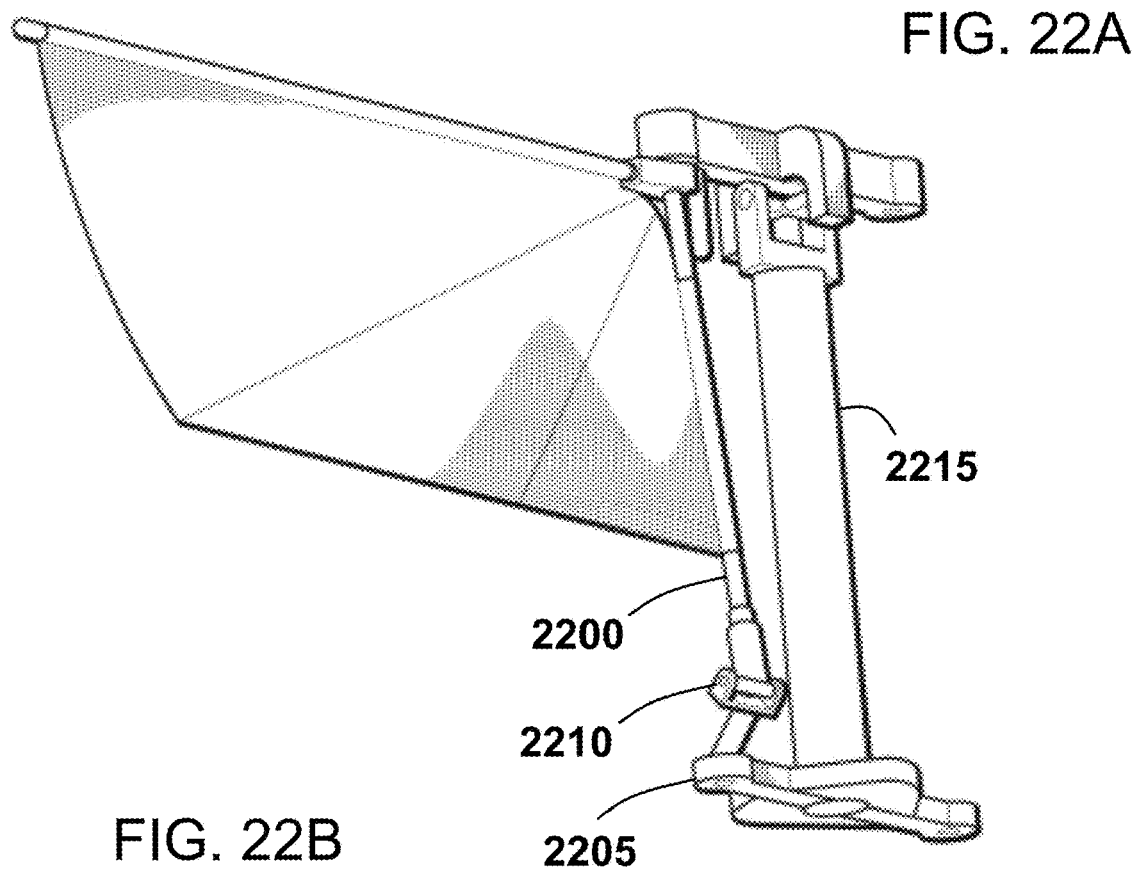
Figure 22C:
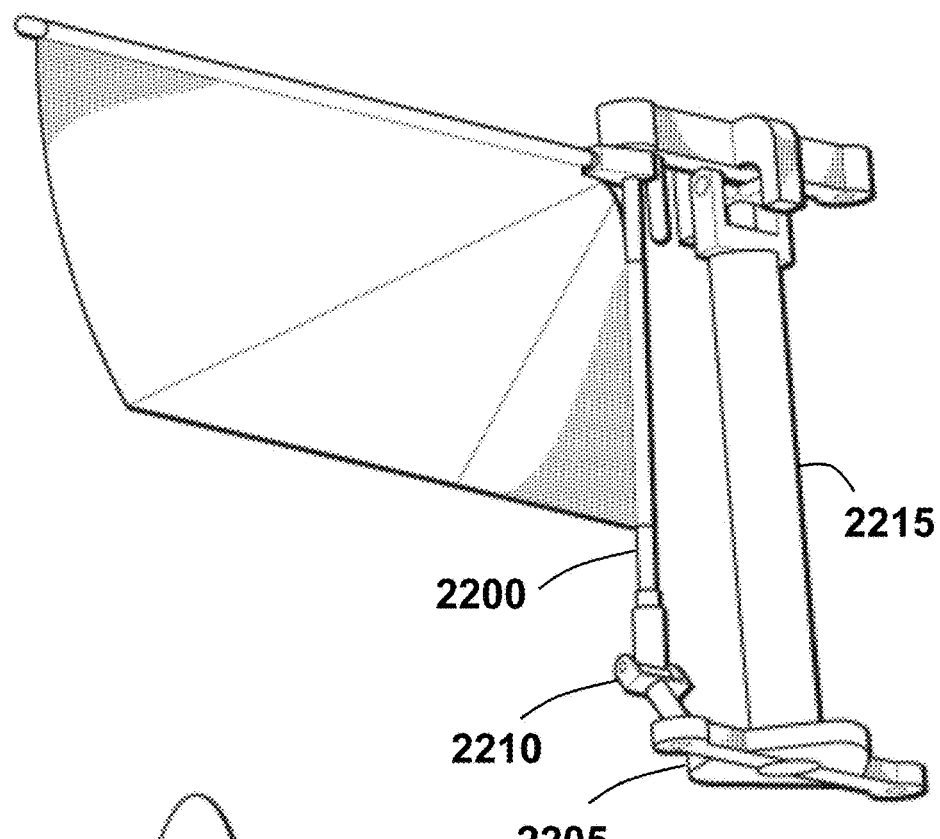

FIGS. 22A, 22B, and 22C illustrate one embodiment of a lower body gimbal system that may have a root spar 2200 coupled to an attitude control arm 2205 through a universal joint 2210 to provide yaw control of an air vehicle. In FIG. 22A, the root spar 2200 is positioned parallel to a boom vang support 2215 and so may produce a neutral yaw position for the aircraft. In FIG. 22B, the root spar 2200 has been actuated toward the viewer and so may depict a right yaw. In FIG. 22C, the root spar 2200 has been actuated away from the viewer and so may depicts a left yaw.

Figure 23:
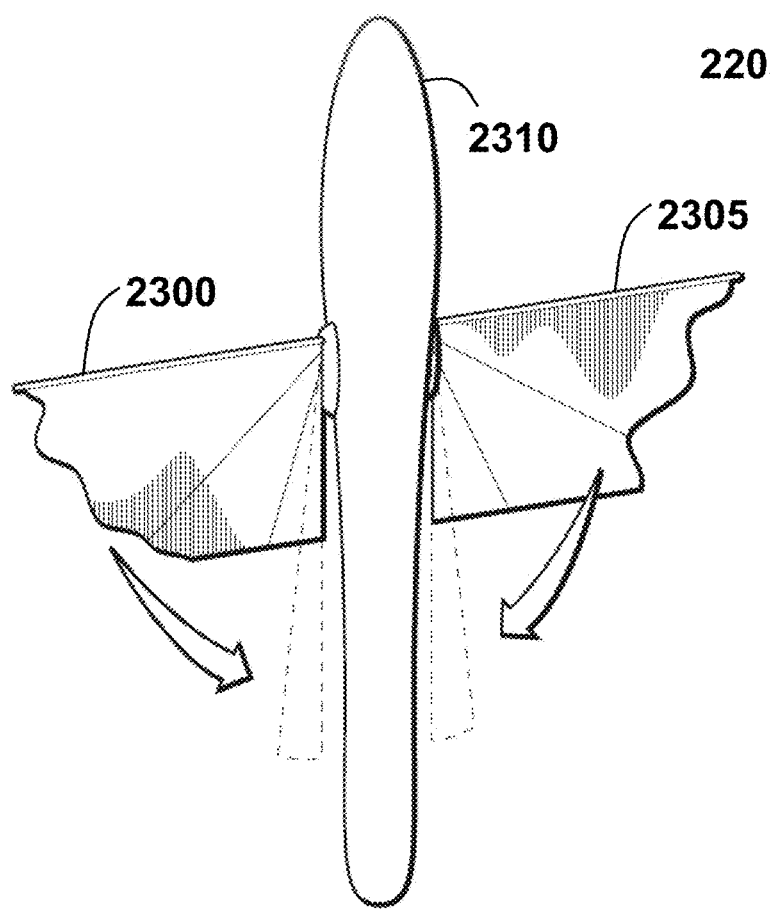
FIG. 23 illustrates one embodiment of an air vehicle that has wings configured to fold against a body of the air vehicle.

FIG. 23 depicts an embodiment of the wings having folding arrangements for storage, and/or returning to a flight configuration. As shown, each wing mast 2300, 2305 may be connected to the flapping mechanism 2310 at its root with a hinge that allows each respective wing mast (2300, 2305) to rotate downward generally in the plane of the wing. The wings may have an additional hinge that may provide two substantially locking positions for the wings to "snap" open or closed by manual manipulation. In another embodiment, the wings may be motorized to close, or close automatically, when flapping stops.

One of ordinary skill in the art will appreciate that the elements, components, steps, and functions described herein may be further subdivided, combined, and/or varied, and yet, still remain within the spirit of the embodiments of the invention. Accordingly, it should be understood that various features and aspects of the disclosed embodiments may be combined with, or substituted for one another in order to form varying modes of the invention, as disclosed by example. It is intended that the scope of the present invention herein disclosed by examples should not be limited by the particular disclosed embodiments described above. Accordingly, the invention has been disclosed by way of example and not limitation, and reference should be made to the following claims to determine the scope of the present invention.

What is claimed is:

1. A system, comprising:
    a crank gear capstan rotatably coupled to a crank gear;
    a first wing capstan coupled to a first wing, the first wing capstan having a first variable-radius drive pulley portion; and
    a first drive linking member configured to drive the first wing capstan, the first drive linking member coupled between the first variable-radius drive pulley portion and the crank gear capstan.

2. The system of claim 1, wherein the first wing capstan is configured to non-constantly, angularly rotate responsive to a constant angular rotation of the crank gear.

3. The system of claim 1, wherein a radius of the first variable-radius drive pulley portion increases about each end of travel of the first wing.

4. The system of claim 1, wherein the first drive linking member is received by the first variable-radius drive pulley portion at a maximum radius of the first variable-radius drive pulley portion as the first wing capstan changes rotational direction.

5. The system of claim 1, wherein an acceleration of the first wing about each end of travel of the first wing is reduced via the first variable-radius drive pulley portion.

6. The system of claim 1, wherein the crank gear capstan is disposed radially offset from a center of rotation of the crank gear.

7. The system of claim 1, further comprising:
    a second wing capstan coupled to a second wing, the second wing capstan having a second variable-radius drive pulley portion; and
    a second drive linking member coupled between the second variable-radius drive pulley portion and the crank gear capstan.

8. The system of claim 7, further comprising:
    a first synchronization pulley and a second synchronization pulley disposed on the first wing capstan and the second wing capstan, respectively; and
    a first crossing synchronization linking member and a second crossing synchronization linking member each windably coupled between the first synchronization pulley and the second synchronization pulley.

9. The system of claim 8, wherein the first wing capstan and the second wing capstan are configured to non-constantly, angularly rotate responsive to a constant angular rotation of the crank gear.

10. The system of claim 8, wherein the first synchronization drive pulley and second synchronization drive pulley are configured with a constant radius.

11. The system of claim 8, wherein the first drive linking member and the second drive linking member each comprise a plurality of cables.

12. The system of claim 8, wherein the first drive linking member and the second drive linking member each are elastic.

* * * * *